(12) United States Patent
Mantin et al.

(10) Patent No.: US 8,689,340 B2
(45) Date of Patent: Apr. 1, 2014

(54) DISK PROTECTION SYSTEM

(75) Inventors: Itsik Mantin, Shoham (IL); Aviad Kipnis, Jerusalem (IL)

(73) Assignee: Cisco Technology Inc., San Jose, CA (US)

( * ) Notice: Subject to any disclaimer, the term of this patent is extended or adjusted under 35 U.S.C. 154(b) by 1338 days.

(21) Appl. No.: 12/084,852

(22) PCT Filed: Jun. 5, 2006

(86) PCT No.: PCT/IL2006/000649
§ 371 (c)(1),
(2), (4) Date: Jul. 11, 2008

(87) PCT Pub. No.: WO2007/060650
PCT Pub. Date: May 31, 2007

(65) Prior Publication Data
US 2009/0113556 A1    Apr. 30, 2009

(30) Foreign Application Priority Data
Nov. 27, 2005  (IL) .......................................... 172207

(51) Int. Cl.
*G06F 21/00*   (2013.01)
(52) U.S. Cl.
USPC .............. 726/26; 380/277; 713/193; 713/189
(58) Field of Classification Search
USPC .................... 726/26–27; 380/277; 713/193
See application file for complete search history.

(56) References Cited

U.S. PATENT DOCUMENTS 6,902,111 B2 *  6/2005  Han et al. ...................... 235/454
2005/0270964 A1  12/2005  Ujino

FOREIGN PATENT DOCUMENTS

WO   WO 99/38162       7/1999
WO   WO 9938162 A1 *  7/1999
WO   WO 2004/066296 A1  8/2004

OTHER PUBLICATIONS

Sep. 14, 2009 Extended European Search report in with EP 06 745 128.6.
Pappu Srinvasa Ravikanth,"Physical One-Way Functions" (Massachusetts Institute of Technology 2001).
Jim Taylor, "*DVD Demystified*", 2d ed., pp. 192-193 (McGraw-Hill 2001).
"Advanced Access Content System (AACS), Technical Overview (informative)" (Jul. 21, 2004).
"The Advanced Encryption Standard (AES)" (Federal Information; Processing Standards Publication 197, Nov. 26, 2001).
"DVD Book", Content Protection for Pre-recorded Media Specification, Rev. 0.93 (4C Entity, LLC Jan. 31, 2001).
"Introduction and Common Cryptographic Elements", Content Protection for Pre-recorded Media Specification, Rev. 1.0 (4C Entity, LLC Jan. 17, 2003).

(Continued)

*Primary Examiner* — Fikremariam A Yalew
*Assistant Examiner* — Kendall Dolly
(74) *Attorney, Agent, or Firm* — Husch Blackwell LLP

(57) ABSTRACT

A method for protecting content on a medium including a token which implements at least a portion of a keyed function, providing a first encryption method and a first encryption key, inputting each one of a plurality of token inputs to the token and converting an output of the token to a function output, and storing a plurality of ordered pairs each including a function input and the corresponding function output, encrypting the plurality of ordered pairs using the first encryption method and the first encryption key, and storing the encrypted plurality of ordered pairs on the medium. Related apparatus and methods are also described.

26 Claims, 27 Drawing Sheets

(56) References Cited

OTHER PUBLICATIONS

"Thwarting Piracy in the Motion Picture Industry—The Case for OpSecure Technology" (Doc-Witness Ltd.).
Feb. 25, 2011 Office Communication in connection with prosecution of EP 06 745 128.6.
Pappu et al., "Physical One-Way Functions," Science vol. 297, pp. 2026-2030 (Sep. 20, 2002).
Jun. 29, 2010 Office Communication in connection with prosecution of EP 06 745 128.6.
Nov. 29, 2012 Office Communication in connection with prosecution of EP 06 745 128.6.
Dec. 3, 2012 Office Communication in connection with prosecution of EP 06 745 128.6.
Jul. 13, 2012 Office Communication in connection with prosecution of EP 06 745 128.6.

* cited by examiner

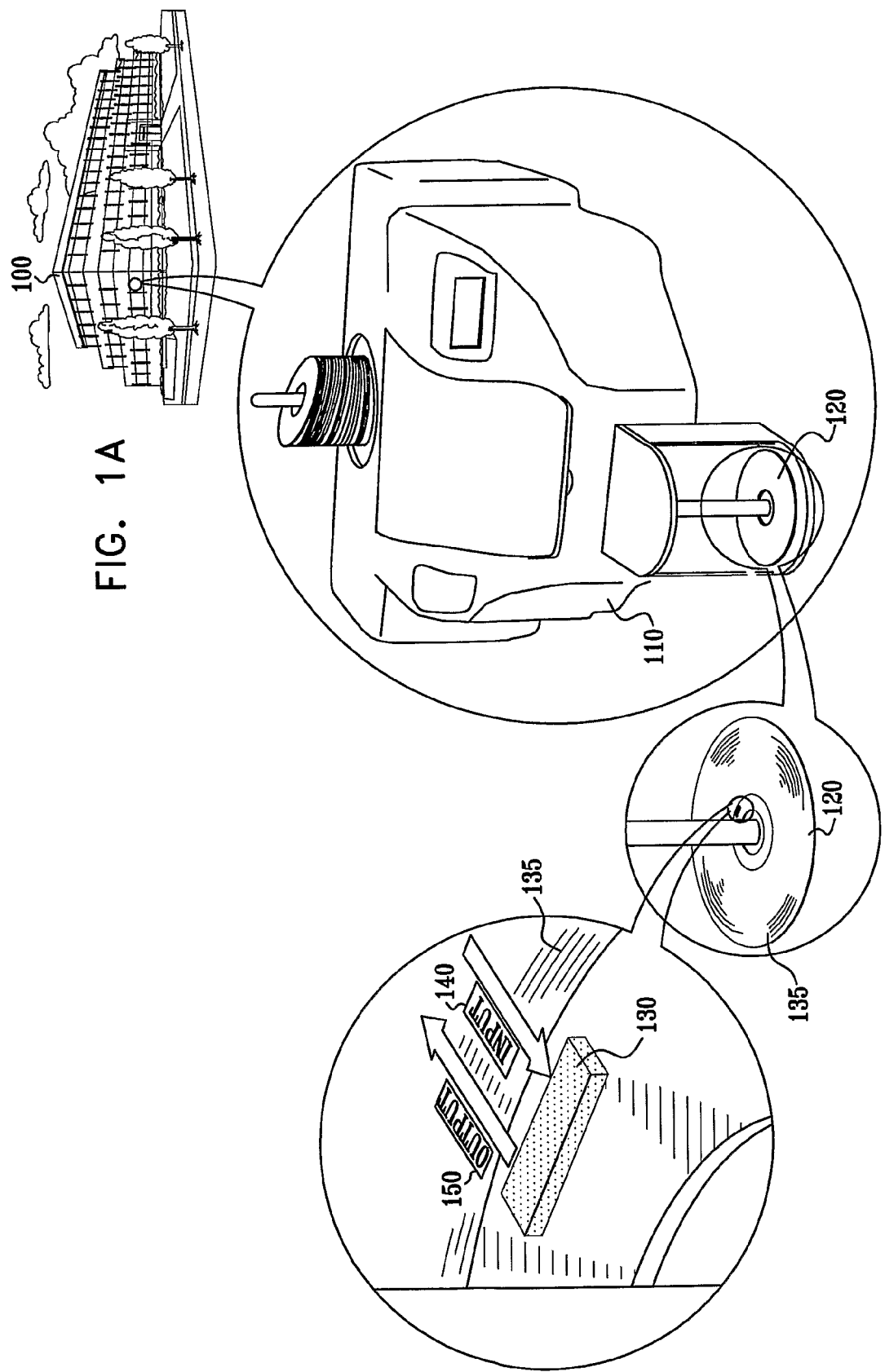

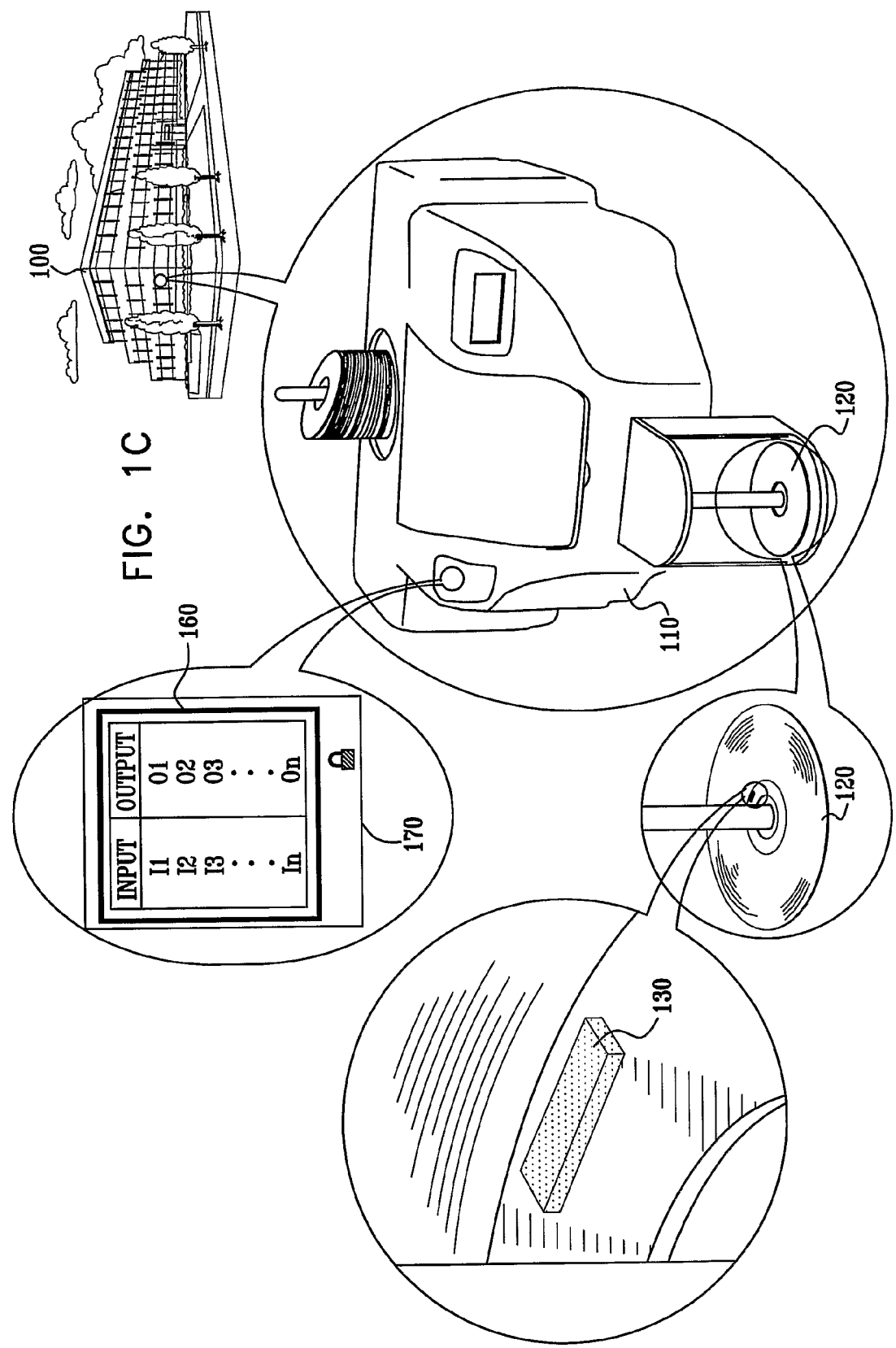

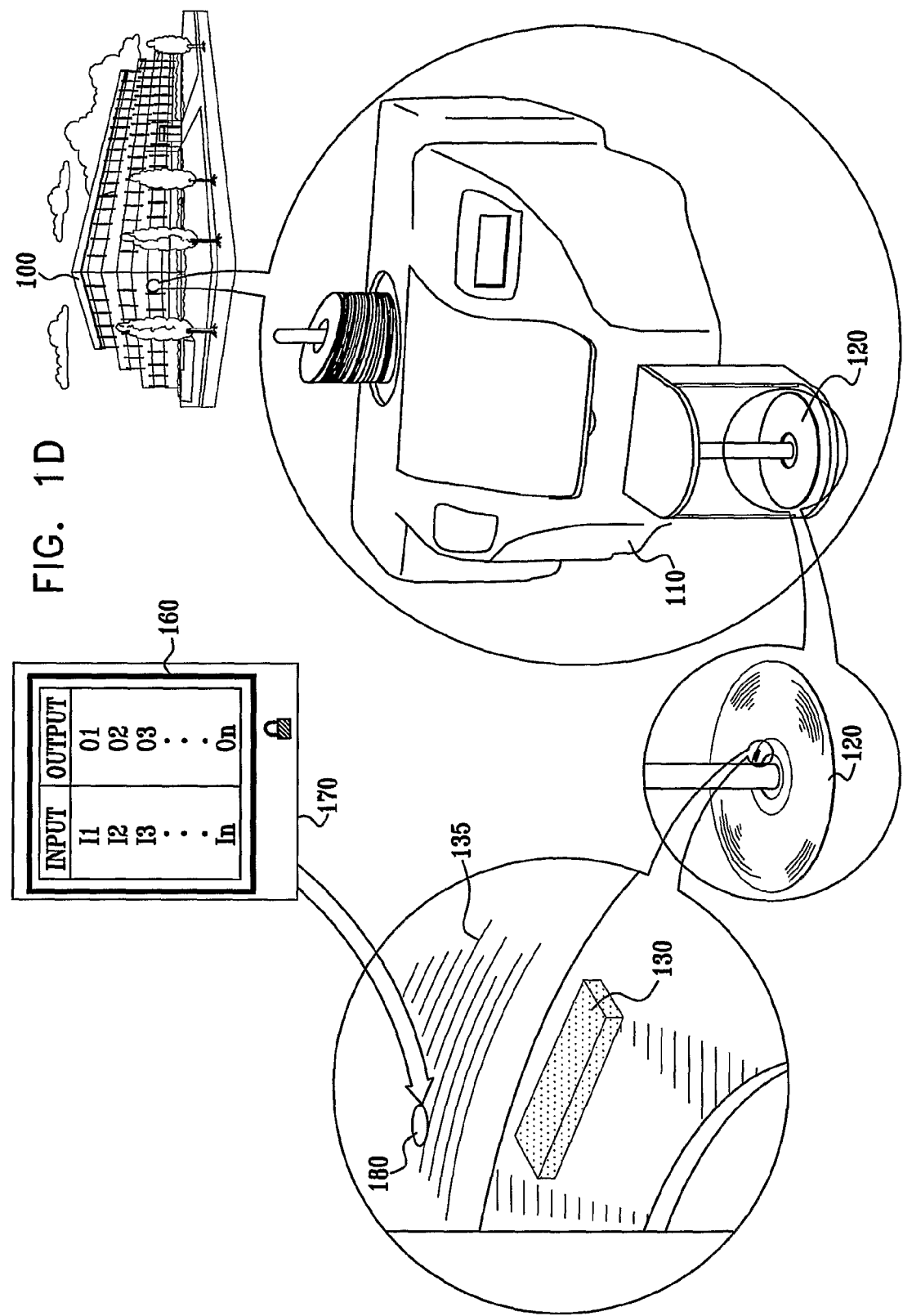

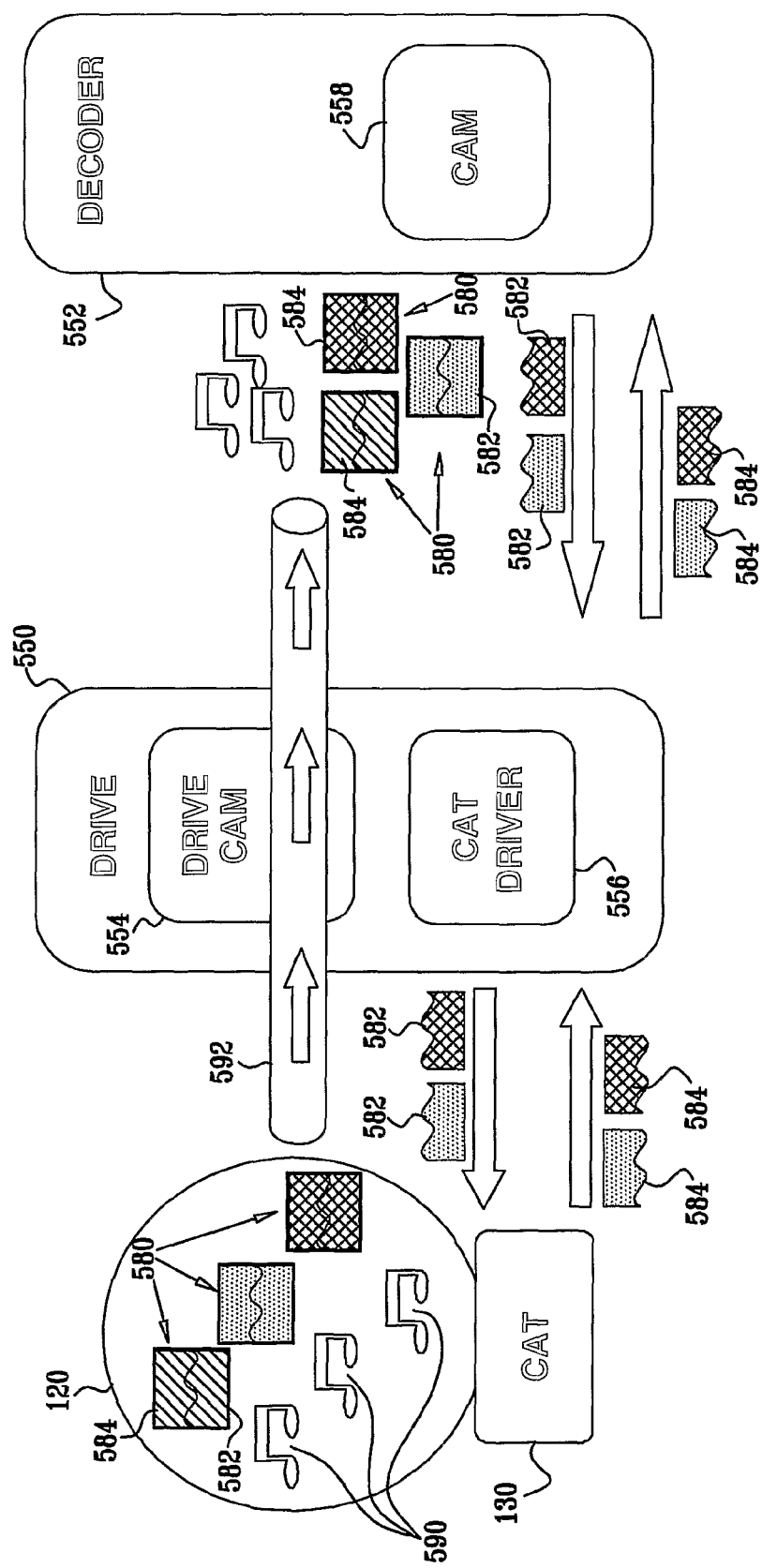

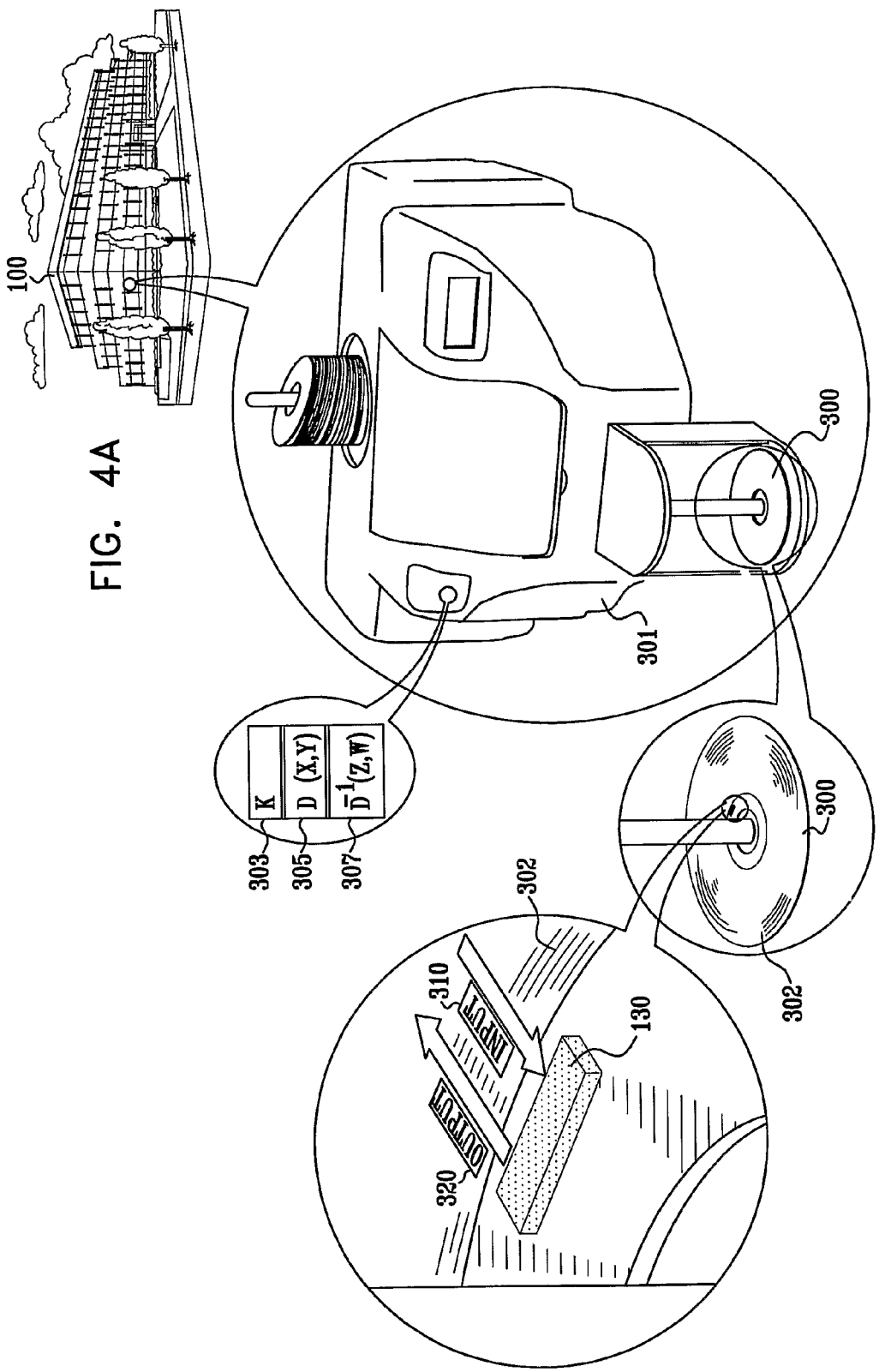

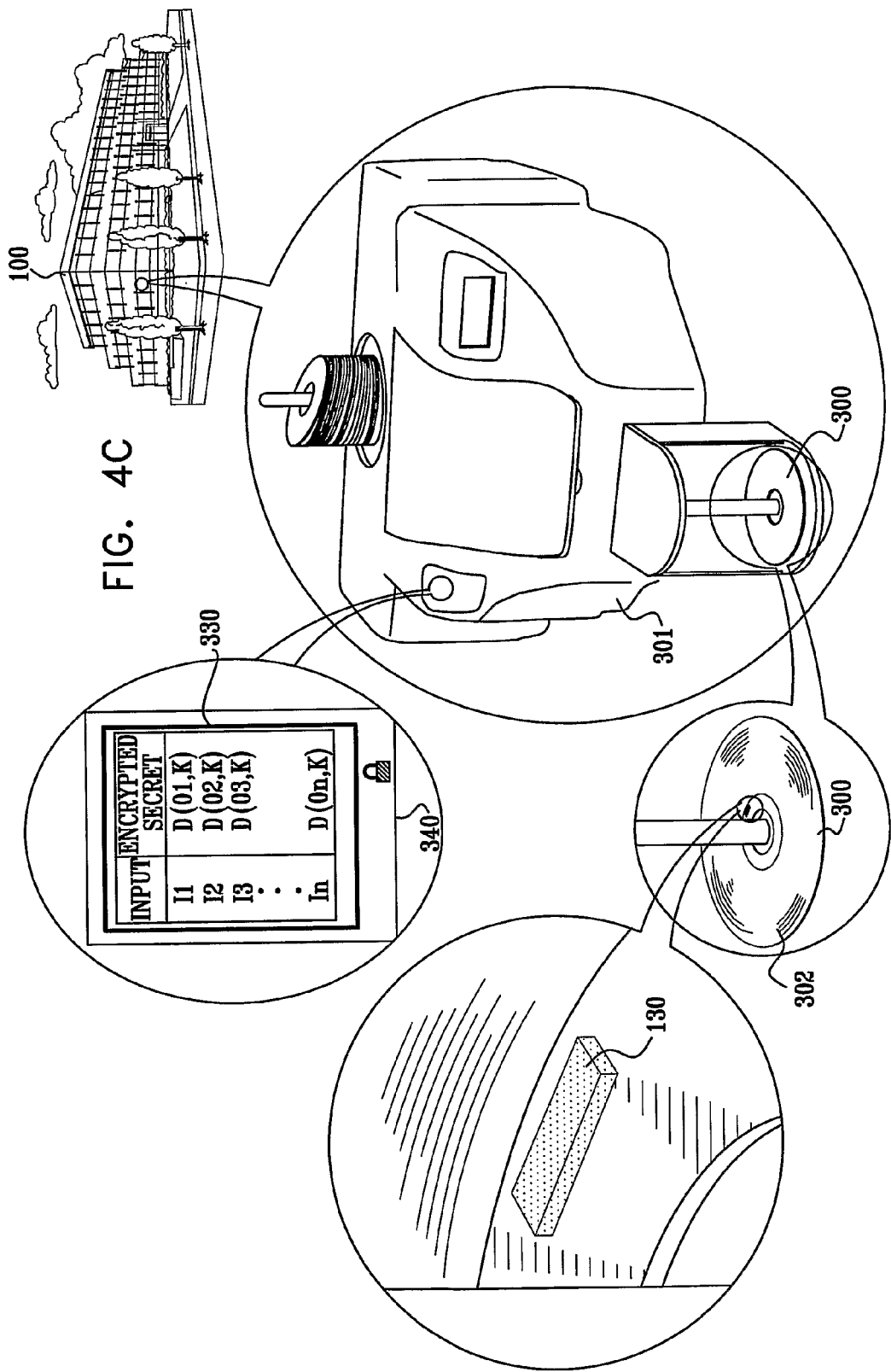

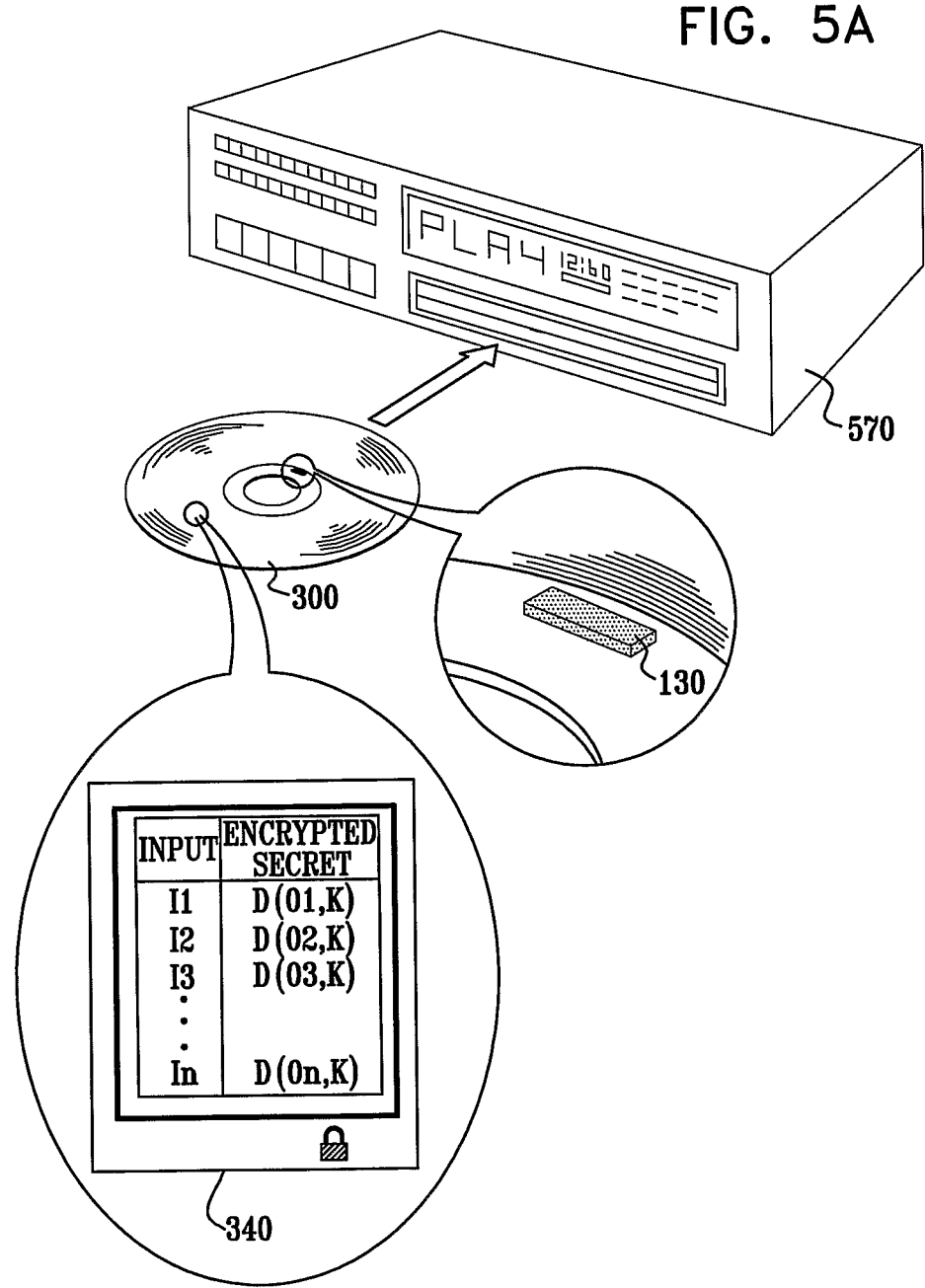

DISK PROTECTION SYSTEM

The present application is a 35 USC §371 application of PCT/IL2006/000649, filed on 5 Jun. 2006 and entitled "DISK PROTECTION SYSTEM", which was published on 31 May 2007 in the English language with International Publication Number WO 2007/060650 A1, and which relies for priority on Israel Patent Application No. 172207, filed on 27 Nov. 2005.

FIELD OF THE INVENTION

The present invention relates to systems for the protection of content on digital storage devices, particularly but not exclusively protection of content on DVD disks.

BACKGROUND OF THE INVENTION

One of the main threats in the DVD world is the mass production of pirate copies of DVDs, which are distributed in black markets. The digital nature of DVDs makes it possible (and usually easy) to create perfect copies of content distributed on DVDs, including the associated control data (such as, for example, encryption keys used in encrypting data on the DVDs), thus bypassing other security mechanisms and obtaining a copy in the same quality as the original. A copy made in such a way is referred to herein as a "bitcopy".

There is a clear need in the DVD industry for security mechanisms which will prevent the above-mentioned scenario, or at least make it substantially more difficult to create such copies.

It is appreciated that the above-mentioned problem is not limited to DVDs, but holds also for other types of storage media.

Typically content is pre-recorded on one storage device and distributed to the markets, and writers (authorized or non-authorized) may copy the content to a blank storage device. If appropriate countermeasures are not taken, authorized players will not have the ability to tell the difference and will play the content from the copied storage device.

A company named Doc-Witness Ltd., 8 Hamelacha Street, Rosh-Ha'ayin 48091, Israel, has published a white paper which describes a product, marketed as OpSecure, which comprises adding a photo detector, chip, LED power source, and PCB (Printed Circuit Board) to storage media in the DVD format to secure the content within. The OpSecure product's description is available on the World Wide Web at:
    www.doc-witness.com/whitepaper.html.

A PhD thesis titled "Physical One-Way Functions" by Pappu Srinivasa Ravikanth of MIT, describes a physical device for implementing one-way functions, the device being referred to throughout the present specification and claims as a "bubble token". The bubble token is a 3D plastic token filled with air bubbles. When a laser beam is directed onto the bubble token, it creates a unique 2D light pattern on a receiver which is located on a side of the token opposite to the laser beam. The thesis is available on the World Wide Web at:
    web.media.mit.edu/~pappu/htm/pubs/
PappuPhDThesis01.pdf.

A white paper describing an industry standard proposed by Intel, IBM, Matsushita and Toshiba for Content Protection for Pre-recorded Media (CPPM) is available upon request from the 4C entity on the World Wide Web at:
    www.4 centity.com/tech/cprm.

A white paper describing an Advanced Access Content System (AACS) is available on the World Wide Web at:
    aacsla.org/media/aacs_technical_overview_040721.pdf.

A symmetric encryption scheme called CSS (Content Scrambling System) is described, for example, in Taylor, J., "DVD Demystified", McGraw-Hill (2000) Second Edition, pp 192-193. Such an encryption scheme is used for encrypting data on DVDs.

A description of the AES (Advanced Encryption Standard) is available at: csrc.nist.gov/publications/flps/fips197/fips-197.pdf.

PCT Patent Application WO 99/38162 of NDS Limited (and corresponding UK Patent GB 2 338 586 to NDS Limited and U.S. patent application Ser. No. 09/376,384 of Bar On et al.) entitled "Protection of data on media recording disks" describe securing transfer of information between a media recording disk and a media recording disk player by means of an electronic security chip attached to the media recording disk, the chip communicating with the disk player via encrypted communication.

The disclosures of all references mentioned above and throughout the present specification, as well as the disclosures of all references mentioned in those references, are hereby incorporated herein by reference.

SUMMARY OF THE INVENTION

The present invention, in preferred embodiments thereof, includes but is not limited to a system and method for bitcopy protection. In particular, the present invention, in preferred embodiments thereof, provides new ways to bind stored content to physical media on which the content is stored, thereby preventing (under the assumptions which are discussed below) standard players, and to some extent non-standard players, from playing a content version which was bound to one physical medium, when the same version of the content is stored on other physical media.

There is thus provided in accordance with a preferred embodiment of the present invention a method for protecting content on a medium, the method including providing a medium including a token, the token implementing at least a portion of a keyed function, providing a plurality of token inputs, each token input being suitable for input to the token, providing a first encryption method and a first encryption key, for each one of the plurality of token inputs inputting the token input to the token and receiving a token output from the token, and converting the token output to a function output, the function output representing a result of performing the keyed function on a function input corresponding to the token input, and storing an ordered pair including the function input and the function output, thereby producing a plurality of ordered pairs, encrypting the plurality of ordered pairs using the first encryption method and the first encryption key, thereby producing an encrypted plurality of ordered pairs, and storing the encrypted plurality of ordered pairs on the medium.

Further in accordance with a preferred embodiment of the present invention the converting includes an identity conversion.

Still further in accordance with a preferred embodiment of the present invention each function input is identical to the corresponding token input.

Additionally in accordance with a preferred embodiment of the present invention each token input is derived from a corresponding function input.

Moreover in accordance with a preferred embodiment of the present invention the providing a plurality of token inputs includes providing a plurality of function inputs, each function input being suitable for input to the keyed function, and converting the plurality of function inputs to a plurality of token inputs.

Further in accordance with a preferred embodiment of the present invention the token is adapted to receive an analog input and produce an analog output, and the providing a plurality of token inputs includes providing a plurality of digital inputs, and converting each of the plurality of digital inputs to an analog form suitable for input to the token, and the receiving a token output from the token includes receiving an analog output from the token, and converting the analog output into digital form to produce a digital output.

Still further in accordance with a preferred embodiment of the present invention the token is adapted to receive a digital input and produce a digital output.

Additionally in accordance with a preferred embodiment of the present invention, providing content to be recorded on the medium, and encrypting the content in accordance with a second encryption method and a content encryption key, thereby producing encrypted content, wherein the storing also includes storing the encrypted content on the medium.

Moreover in accordance with a preferred embodiment of the present invention the first encryption method and the second encryption method are identical.

Further in accordance with a preferred embodiment of the present invention the first encryption method is different from the second encryption method.

Still further in accordance with a preferred embodiment of the present invention the first encryption key and the content encryption key are identical.

Additionally in accordance with a preferred embodiment of the present invention the first encryption key is different from the content encryption key.

Moreover in accordance with a preferred embodiment of the present invention the encrypted plurality of ordered pairs is stored in a medium content area.

Further in accordance with a preferred embodiment of the present invention the encrypted plurality of ordered pairs is stored in a medium control area.

There is also provided in accordance with another preferred embodiment of the present invention a medium including protected content, produced by any of the methods described above.

There is also provided in accordance with still another preferred embodiment of the present invention a method for protecting content on a medium, the method including providing a medium including a token, the token implementing at least a portion of a keyed function, providing a plurality of token inputs, each token input being suitable for input to the token, providing a first encryption method and a first encryption key, for each one of the plurality of token inputs inputting the token input to the token and receiving a token output from the token, converting the token output to a function output, the function output representing a result of performing the keyed function on a function input corresponding to the token input, and encrypting an ordered pair including the function input and the function output using the first encryption method and the first encryption key, thereby producing a plurality of encrypted ordered pairs, and storing the plurality of encrypted ordered pairs on the medium.

Further in accordance with a preferred embodiment of the present invention the converting includes an identity conversion.

Still further in accordance with a preferred embodiment of the present invention each function input is identical to the corresponding token input.

Additionally in accordance with a preferred embodiment of the present invention each token input is derived from a corresponding function input.

Moreover in accordance with a preferred embodiment of the present invention the providing a plurality of token inputs includes providing a plurality of function inputs, each function input being suitable for input to the keyed function, and converting the plurality of function inputs to a plurality of token inputs.

Further in accordance with a preferred embodiment of the present invention the token is adapted to receive an analog input and produce an analog output, and the providing a plurality of token inputs includes providing a plurality of digital inputs, and converting each of the plurality of digital inputs to an analog form suitable for input to the token, and the receiving a token output from the token includes receiving an analog output from the token, and converting the analog output into digital form to produce a digital output.

Still further in accordance with a preferred embodiment of the present invention the token is adapted to receive a digital input and produce a digital output.

Additionally in accordance with a preferred embodiment of the present invention, providing content to be recorded on the medium, and encrypting the content in accordance with a second encryption method and a content encryption key, thereby producing encrypted content, wherein the storing also includes storing the encrypted content on the medium.

Moreover in accordance with a preferred embodiment of the present invention the first encryption method and the second encryption method are identical.

Further in accordance with a preferred embodiment of the present invention the first encryption method is different from the second encryption method.

Still further in accordance with a preferred embodiment of the present invention the first encryption key and the content encryption key are identical.

Additionally in accordance with a preferred embodiment of the present invention the first encryption key is different from the content encryption key.

Moreover in accordance with a preferred embodiment of the present invention at least one of the plurality of encrypted ordered pairs is stored in a medium content area.

Further in accordance with a preferred embodiment of the present invention at least one of the plurality of encrypted ordered pairs is stored in a medium control area.

There is also provided in accordance with another preferred embodiment of the present invention a medium including protected content, produced by any of the methods described above.

There is also provided in accordance with still another preferred embodiment of the present invention a method for protecting content on a medium, the method including providing a medium including a token, the token implementing at least a portion of a keyed function, providing a plurality of token inputs, each token input being suitable for input to the token, providing a first encryption method and a first encryption key, and for each one of the plurality of token inputs inputting the token input to the token and receiving a token output from the token, converting the token output to a function output, the function output representing a result of performing the keyed function on a function input corresponding to the token input, encrypting an ordered pair including the function input and the function output using the first encryption method and the first encryption key, and storing the encrypted ordered pair on the medium, thereby storing a plurality of encrypted ordered pairs on the medium.

Further in accordance with a preferred embodiment of the present invention the converting includes an identity conversion.

Still further in accordance with a preferred embodiment of the present invention each function input is identical to the corresponding token input.

Additionally in accordance with a preferred embodiment of the present invention each token input is derived from a corresponding function input.

Moreover in accordance with a preferred embodiment of the present invention the providing a plurality of token inputs includes providing a plurality of function inputs, each function input being suitable for input to the keyed function, and converting the plurality of function inputs to a plurality of token inputs.

Further in accordance with a preferred embodiment of the present invention at least one of the plurality of encrypted ordered pairs is stored in a medium content area.

Still further in accordance with a preferred embodiment of the present invention the token is adapted to receive an analog input and produce an analog output, and the providing a plurality of token inputs includes providing a plurality of digital inputs, and converting each of the plurality of digital inputs to an analog form suitable for input to the token, and the receiving a token output from the token includes receiving an analog output from the token, and converting the analog output into digital form to produce a digital output.

Additionally in accordance with a preferred embodiment of the present invention the token is adapted to receive a digital input and produce a digital output.

Moreover in accordance with a preferred embodiment of the present invention, providing content to be recorded on the medium, and encrypting the content in accordance with a second encryption method and a content encryption key, thereby producing encrypted content, wherein the storing also includes storing the encrypted content on the medium.

Further in accordance with a preferred embodiment of the present invention the first encryption method and the second encryption method are identical.

Still further in accordance with a preferred embodiment of the present invention the first encryption method is different from the second encryption method.

Additionally in accordance with a preferred embodiment of the present invention the first encryption key and the content encryption key are identical.

Moreover in accordance with a preferred embodiment of the present invention the first encryption key is different from the content encryption key.

There is also provided in accordance with another preferred embodiment of the present invention a medium including protected content, produced by any of the methods described above.

There is also provided in accordance with still another preferred embodiment of the present invention a method for determining whether content stored on a medium includes authorized content, the method including providing a medium, the medium including a token, the token implementing at least a portion of a keyed function, the medium having stored thereon encrypted content and an encrypted plurality of ordered pairs, the encrypted content being encrypted in accordance with a first encryption method and a content encryption key, the encrypted plurality of ordered pairs being encrypted in accordance with a second encryption method and a second encryption key, receiving the encrypted plurality of ordered pairs from the medium and decrypting the encrypted plurality of ordered pairs, thus producing a plurality of ordered pairs, providing a challenge to the medium, the challenge including a token input suitable for input to the token, receiving a response from the medium, performing exactly one of the following: ignoring the response, and performing the following: selecting, from the plurality of ordered pairs, an ordered pair having a first value equal to the keyed function input corresponding to the challenge, converting the response to a function output, the function output representing a result of performing the keyed function on a function input corresponding to the challenge, comparing the function output to a second value of the selected ordered pair, and determining that the response is a correct response only if the function output is substantially equal to the second value, and otherwise determining that the response is not a correct response, and determining whether content stored on the medium is authorized based, at least in part, on a result of the performing exactly one.

Further in accordance with a preferred embodiment of the present invention the providing a challenge to the medium includes providing a challenge to the token.

Still further in accordance with a preferred embodiment of the present invention the converting includes an identity conversion.

Additionally in accordance with a preferred embodiment of the present invention each function input is identical to the corresponding token input.

Moreover in accordance with a preferred embodiment of the present invention each token input is derived from a corresponding function input.

Further in accordance with a preferred embodiment of the present invention the providing a plurality of token inputs includes providing a plurality of function inputs, each function input being suitable for input to the keyed function, and converting the plurality of function inputs to a plurality of token inputs.

Still further in accordance with a preferred embodiment of the present invention the first encryption method and the second encryption method are identical.

Additionally in accordance with a preferred embodiment of the present invention the first encryption method is different from the second encryption method.

Moreover in accordance with a preferred embodiment of the present invention the content encryption key and the second encryption key are identical.

Further in accordance with a preferred embodiment of the present invention the content encryption key is different from the second encryption key.

Still further in accordance with a preferred embodiment of the present invention the determining includes determining that the response is a correct response only if the function output is exactly equal to the second value.

Additionally in accordance with a preferred embodiment of the present invention the determining that the response is a correct response includes applying a policy defining circumstances under which the response is considered a correct response.

Moreover in accordance with a preferred embodiment of the present invention the policy is based, at least in part, on at least one past response.

Further in accordance with a preferred embodiment of the present invention the policy is based, at least in part, on an elapsed time between providing the challenge and receiving the response.

Still further in accordance with a preferred embodiment of the present invention the receiving the encrypted plurality of ordered pairs also includes receiving at least part of the encrypted content from the medium, at least a portion of the at least part of the content is encrypted, and the decrypting includes decrypting the portion of the encrypted content, thus producing at least a portion of the content.

Additionally in accordance with a preferred embodiment of the present invention, preventing rendering of the content only if the response is determined to not be a correct response.

Moreover in accordance with a preferred embodiment of the present invention at least one of the providing a challenge and the receiving a response takes place when the medium is not in a regular data-transfer state.

Further in accordance with a preferred embodiment of the present invention the regular data-transfer state includes the medium rotating.

There is also provided in accordance with another preferred embodiment of the present invention a player operative to determine whether content stored on a medium includes authorized content, according to any of the methods described above.

There is also provided in accordance with still another preferred embodiment of the present invention a method for producing a medium, the method including providing a medium including a token, the token implementing at least a portion of a keyed function, providing a secret k, providing a function D having an associated inverse function $D^{-1}$, providing a plurality of token inputs, each token input being suitable for input to the token, for each one of the plurality of token inputs inputting the token input to the token and receiving a token output from the token, converting the token output to a function output o, the function output o representing a result of performing the keyed function on a function input corresponding to the token input, computing D(o,k), and storing an ordered pair including a function input corresponding to the token input and D(o,k) on the medium.

Further in accordance with a preferred embodiment of the present invention the secret k includes a cryptographic decryption key.

Still further in accordance with a preferred embodiment of the present invention the converting includes an identity conversion.

Additionally in accordance with a preferred embodiment of the present invention each function input is identical to the corresponding token input.

Moreover in accordance with a preferred embodiment of the present invention each token input is derived from a corresponding function input.

Further in accordance with a preferred embodiment of the present invention the providing a plurality of token inputs includes providing a plurality of function inputs, each function input being suitable for input to the keyed function, and converting the plurality of function inputs to a plurality of token inputs.

Still further in accordance with a preferred embodiment of the present invention at least one of the ordered pairs is stored in a medium content area.

There is also provided in accordance with another preferred embodiment of the present invention a method for producing a medium, the method including providing a medium including a token, the token implementing at least a portion of a keyed function, providing a secret k, providing a function D having an associated inverse function $D^{-1}$, providing a plurality of token inputs, each token input being suitable for input to the token, for each one of the plurality of token inputs inputting the token input to the token and receiving a token output from the token, converting the token output to a function output o, the function output o representing a result of performing the keyed function on a function input corresponding to the token input, computing D(o,k), encrypting an ordered pair including a function input corresponding to the token input and D(o, k), and storing the encrypted ordered pair on the medium.

Further in accordance with a preferred embodiment of the present invention the converting includes an identity conversion.

Still further in accordance with a preferred embodiment of the present invention each function input is identical to the corresponding token input.

Additionally in accordance with a preferred embodiment of the present invention each token input is derived from a corresponding function input.

Moreover in accordance with a preferred embodiment of the present invention the providing a plurality of token inputs includes providing a plurality of function inputs, each function input being suitable for input to the keyed function, and converting the plurality of function inputs to a plurality of token inputs.

Further in accordance with a preferred embodiment of the present invention at least one of the encrypted ordered pairs is stored in a medium content area.

There is also provided in accordance with another preferred embodiment of the present invention a method for producing a medium, the method including providing a medium including a token, the token implementing at least a portion of a keyed function, providing a first encryption method and a first encryption key, providing a secret k, providing a function D having an associated inverse function $D^{-1}$, providing a plurality of token inputs, each token input being suitable for input to the token, for each one of the plurality of token inputs inputting the token input to the token and receiving a token output from the token, converting the token output to a function output o, the function output o representing a result of performing the keyed function on a function input corresponding to the token input, computing D(o,k), and storing an ordered pair including a function input corresponding to the token input and D(o,k), thereby producing a plurality of ordered pairs, encrypting the plurality of ordered pairs using the first encryption method and the first encryption key, thereby producing an encrypted plurality of ordered pairs, and storing the encrypted plurality of ordered pairs on the medium.

Further in accordance with a preferred embodiment of the present invention the converting includes an identity conversion.

Still further in accordance with a preferred embodiment of the present invention each function input is identical to the corresponding token input.

Additionally in accordance with a preferred embodiment of the present invention each token input is derived from a corresponding function input.

Moreover in accordance with a preferred embodiment of the present invention the providing a plurality of token inputs includes providing a plurality of function inputs, each function input being suitable for input to the keyed function, and converting the plurality of function inputs to a plurality of token inputs.

Further in accordance with a preferred embodiment of the present invention, encrypting content in accordance with a second encryption method and the secret k, thereby producing encrypted content, and storing the encrypted content on the medium.

Still further in accordance with a preferred embodiment of the present invention the first encryption method and the second encryption method are identical.

Additionally in accordance with a preferred embodiment of the present invention the first encryption method is different from the second encryption method.

Moreover in accordance with a preferred embodiment of the present invention the encrypted plurality of ordered pairs is stored in a medium content area.

Further in accordance with a preferred embodiment of the present invention the encrypted plurality of ordered pairs is stored in a medium control area.

There is also provided in accordance with still another preferred embodiment of the present invention a method for accessing a medium, the method including providing a medium including a token, the token implementing at least a portion of a keyed function, the medium having stored thereon encrypted content and a plurality of ordered pairs, the encrypted content being encrypted in accordance with an encryption method and a content encryption key, providing a function D, providing a function $D^{-1}$, the function $D^{-1}$ being an inverse function of the function D, selecting one of the plurality of ordered pairs, each ordered pair including a function input and D(o,k), inputting a token input corresponding to the function input to the token, and receiving a token output from the token, converting the token output to a function output o, the function output o representing a result of performing the keyed function on a function input corresponding to the token input, computing $D^{-1}(o,D(o,k))$ and producing a result k.

Further in accordance with a preferred embodiment of the present invention the converting includes an identity conversion.

Still further in accordance with a preferred embodiment of the present invention each function input is identical to the corresponding token input.

Additionally in accordance with a preferred embodiment of the present invention each token input is derived from a corresponding function input.

Moreover in accordance with a preferred embodiment of the present invention the providing a plurality of token inputs includes providing a plurality of function inputs, each function input being suitable for input to the keyed function, and converting the plurality of function inputs to a plurality of token inputs.

Further in accordance with a preferred embodiment of the present invention using the result k to decrypt the encrypted content.

There is also provided in accordance with another preferred embodiment of the present invention a medium for storing content, the medium including a content storage area, an ordered pair storage area, and a token, the token implementing at least a portion of a keyed function and being operative to receive a plurality of token inputs and produce a plurality of token outputs, each token output representing a result of performing the keyed function on a function input corresponding to the token input.

Further in accordance with a preferred embodiment of the present invention at least part of the ordered pair storage area is interleaved with the content storage area.

Still further in accordance with a preferred embodiment of the present invention the ordered pair storage area stores a plurality of ordered pairs, each ordered pair includes a function input corresponding to a token input, and the associated function output corresponding to the token output produced by the token.

Additionally in accordance with a preferred embodiment of the present invention the plurality of ordered pairs are stored in encrypted form.

Moreover in accordance with a preferred embodiment of the present invention each ordered pair is separately encrypted.

Further in accordance with a preferred embodiment of the present invention the plurality of ordered pairs are encrypted as a unit.

Still further in accordance with a preferred embodiment of the present invention the content storage area stores content.

Additionally in accordance with a preferred embodiment of the present invention the content is encrypted in accordance with an encryption method and an encryption key.

Moreover in accordance with a preferred embodiment of the present invention the token is adapted to receive an analog token input and produce an analog token output, and the medium also includes a digital-to-analog input unit receiving a plurality of digital inputs and converting each of the plurality of digital inputs to an analog form suitable for input to the token, and an analog-to-digital output unit receiving the plurality of analog outputs from the token and converting each of the plurality of analog outputs into digital form to produce a plurality of digital outputs.

Further in accordance with a preferred embodiment of the present invention the token is adapted to receive a digital input and produce a digital output.

BRIEF DESCRIPTION OF THE DRAWINGS

The present invention will be understood and appreciated more fully from the following detailed description, taken in conjunction with the drawings in which:

FIGS. 1A-1D are simplified partly pictorial, partly block diagram illustrations depicting a preferred system for producing a medium comprising a token and storing an encrypted plurality of ordered pairs on the medium, the medium being constructed and operative in accordance with a preferred embodiment of the present invention;

FIG. 3C is a functional block diagram illustration depicting in more detail the flow of data and content in the preferred embodiment depicted in FIG. 3B;

FIGS. 4A-4D are simplified partly pictorial, partly block diagram illustrations depicting an alternative preferred system for producing a medium comprising a token and storing an encrypted plurality of ordered pairs, the medium being constructed and operative in accordance with another alternative preferred embodiment of the present invention;

FIGS. 5A-5D are simplified partly pictorial, partly block diagram illustrations depicting a preferred system for computing a secret from a response from the medium of FIG. 4E;

DETAILED DESCRIPTIONS OF PREFERRED EMBODIMENTS

Figure 1B:
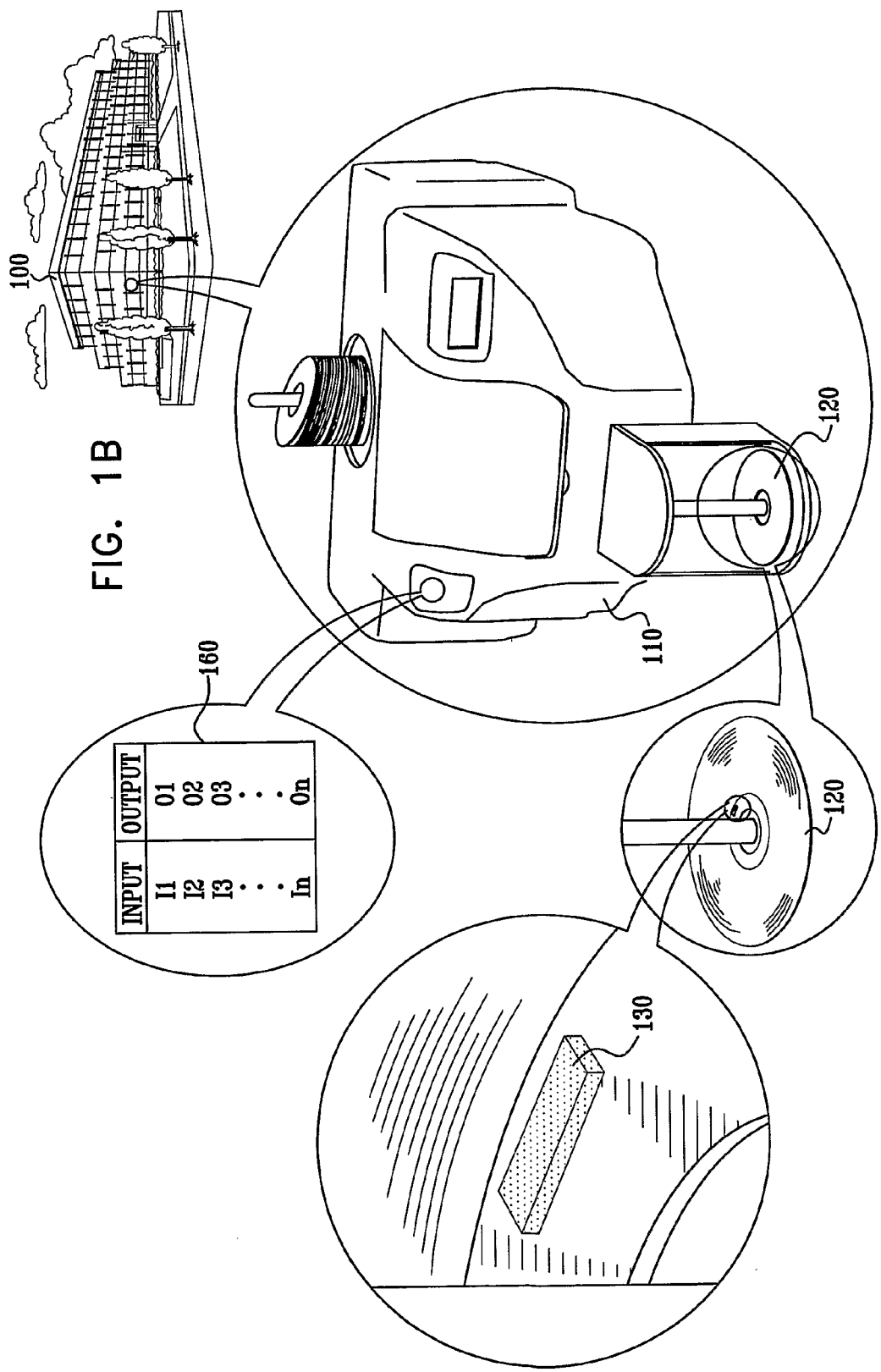

The present invention, in preferred embodiments thereof, provides new ways to bind stored content to physical media. Several preferred embodiments are described below:

production of "blank" media which is produced so a user can bind the user's content to the media (FIGS. 1A-1E);

determining whether data stored on a physical media is actually bound to the specific media (FIGS. 2A-2D); and production of physical media containing content (see FIGS. 4A-4E);

computing a secret for decrypting encrypted content bound to the physical media (FIGS. 5A-5D).

The following terms are defined and explained as they will be used (in all their grammatical forms) throughout the present specification and claims:

Medium: a device for storing digital content. Devices for storing digital content in accordance with preferred embodiments of the present invention (also referred to herein as "media") may be of many different types, including but not limited to: DVDs; CDs; ZIP® disks; backup tapes; Bernoulli drives; portable hard drives; disk on key devices; and other appropriate types of removable computer data storage media.

Content: various types of digital content such as video, still images, audio, programs, games, interactive applications, and so forth.

Device key: a cryptographic key which is provided to one or more authorized players of storage media.

Authorized device: a storage media player which comprises at least one device key.

Content key: a cryptographic key with which content is encrypted.

Encrypted content: portions of content on a medium which are encrypted in accordance with an encryption method and at least one key. Encrypted content can optionally be encrypted using secondary and tertiary encryptions. Different parts of the content on a medium can be encrypted with different keys. Secondary encryption, also termed super-encryption, is a process well known in the art in which encrypted content is encrypted again without being decrypted, usually with a different key. Tertiary encryption is a process well known in the art comprising super-super-encryption.

Medium content area: an area on a medium where content is stored.

Medium control area: an area on a medium where control data is stored. Control data includes, for example, and without limiting the generality of the foregoing: headers, keys, etc.

Media Key Block (MKB): a data segment from which authorized devices can compute a particular key. An example MKB is described in the CPPM and AACS references mentioned above. The MKB is preferably used in the present system as a secure broadcast channel between a media production facility and authorized devices. The MKB is usually stored in the control part of the media.

"Keyed function": A digital function whose evaluation requires a function enabler. The term "function enabler" in all its grammatical forms is used throughout the present specification and claims interchangeably with the term "key" and its corresponding grammatical forms. In other words, when a key is available, it is easy to obtain an output corresponding to a given input, and in the absence of the key, it is hard to obtain an output corresponding to a given input. Even when provided with many outputs corresponding to many inputs, it is hard to obtain a new output corresponding to a given new input, if the key is not available.

"Analog keyed function": a keyed function whose key is a physical item, such as, for example, and without limiting the generality of the foregoing, an analog token.

"Digital keyed function": a keyed function whose key is digital, such as, for example, and without limiting the generality of the foregoing, a cryptographic key.

Conditional Access Token (CAT): A digital or analog token which comprises a key to a keyed function. The CAT preferably has the following properties:

it is easy and cheap to produce CATs which comprise keys to keyed functions;

given a first CAT comprising a key to a first keyed function, it is hard to replicate the first CAT; and given a first CAT comprising a key to a first keyed function, it is hard to produce a second CAT, comprising a key to a second keyed function, where the second keyed function, using the second key, provides an indication of values which the first keyed function, using the first key, would provide.

One example of an analog CAT, referred to herein as a "bubble token", is described in a PhD thesis titled "Physical One-Way Functions" by Pappu Srinivasa Ravikanth of MIT, referenced above and described in further detail below, with reference to FIGS. 1A-3C.

"CAT input": an input to a CAT, corresponding to an input of a keyed function. The correspondence is not necessarily one-to-one; multiple CAT inputs can correspond to one input of the keyed function, and multiple inputs of the keyed function can correspond to one CAT input.

"Analog CAT input": an analog input to an analog CAT. The analog CAT input preferably corresponds to a digital input to the keyed function.

"Digital CAT input": a digital input to a digital CAT. In some preferred embodiments of the present invention the digital CAT input is identical to the input of the keyed function.

"CAT output": an output of a CAT, corresponding to an output of a keyed function. The correspondence is not necessarily one-to-one; multiple CAT outputs can correspond to one output of the keyed function, and multiple outputs of the keyed function can correspond to one CAT output.

"Analog CAT output": an analog output of an analog CAT. The output of the keyed function preferably comprises a digital encoding of the analog CAT output.

"Digital CAT output": a digital output of a digital CAT. In some preferred embodiments of the present invention the digital CAT output is identical to the output of the keyed function.

CAT pair: A CAT input and a corresponding CAT output. A CAT pair corresponds to a keyed function pair, which comprises: a keyed function input corresponding to the CAT input; and a keyed function output corresponding to the CAT output.

CAT Challenge Selection Strategy (CCSS): a strategy for the selection of a CAT pair from a plurality of CAT pairs.

CAT Acceptance Policy (CAP): a policy according to which a determination is made whether or not to accept an authentication provided by a series of one or more CAT challenges and responses.

A default CAP: a CAP which is comprised in a media player. The default CAP is thus available to a media player regardless of the presence of storage media in the media player.

A default CCSS: a CCSS which is comprised in a media player. The default CCSS is thus available to a media player regardless of the presence of storage media in the media player.

An attached CAP: a CAP which is comprised in storage media. The attached CAP is thus available to a media player after the media player reads the attached CAP from the storage media.

An attached CCSS: a CCSS which is comprised in storage media. The attached CCSS is thus available to a media player after the media player reads the attached CCSS from the storage media.

Reference is now made to FIGS. 1A-1D, which are simplified partly pictorial, partly block diagram illustrations depicting a preferred system for producing a medium comprising a token and storing an encrypted plurality of ordered pairs on the medium, the medium being constructed and operative in accordance with a preferred embodiment of the present invention.

FIG. 1A depicts a production facility 100, housing one or more of disk production devices 110. The production facility 100 is not part of the current invention, and is depicted solely in order to illustrate a typical setting where certain preferred embodiments of the current invention may be produced. The disk production device 110 may be used, as described in more detail below, for the production of digital storage devices such as, for example, and without limiting the generality of the foregoing, a DVD 120.

Persons skilled in the art will appreciate that the example of a DVD is chosen for purposes of simplicity of description and is not intended to limit the generality of the present invention. Digital storage devices in accordance with preferred embodiments of the present invention (also referred to herein as "media") may be of many different types, including but not limited to: DVDs; CDs; ZIP® disks; backup tapes; Bernoulli drives; portable hard drives; disk on key devices; and other appropriate types of removable computer data storage media.

The DVD 120 preferably comprises a CAT 130, a medium control area (not shown), as is well known in the art, and a medium content area 135, as is well known in the art. The CAT 130 is operative to receive inputs and produce outputs. Thus, the CAT 130 is an embodiment of a function enabler of a keyed function. Another example of a CAT is described below. Yet another example of a CAT is an OpSecure system described in reference to FIG. 3C below.

The CAT 130 preferably comprises an analog or digital CAT which comprises a key to an analog or digital keyed function respectively. The CAT 130 is operative to receive CAT inputs and produce CAT outputs. One example of a CAT is the "bubble token" referred to above.

The disk production device 110 is preferably operative to iteratively:
  provide an input (not shown) to the keyed function;
  use the input (not shown) to produce a corresponding CAT input 140;
  provide the CAT input 140 to the CAT 130;
  receive a CAT output 150 from the CAT 130; and
  produce an output (not shown) of the keyed function corresponding to the CAT output 150,
thus iteratively producing a plurality of ordered pairs of keyed function inputs and keyed function outputs, and to store the plurality of ordered pairs, as described in more detail below.

In some preferred embodiments of the present invention the CAT 130 comprises a processor operative to receive the CAT input 140 from the disk production device 110 and produce the CAT output 150 to the disk production device 110, implementing an embodiment of a keyed function as described above. For example, and without limiting the generality of the foregoing, the CAT can be a RFID token and the function can be AES decryption with a hard-coded secret key.

FIG. 1A depicts the disk production device 110 providing the CAT input 140 corresponding to the keyed function input (not shown) to the CAT 130 of the DVD 120, receiving the CAT output 150 from the CAT 130 of the DVD 120, and producing the keyed function output (not shown), corresponding to the CAT output 150.

Reference is now made to FIG. 1B, which depicts the system of FIG. 1A after the disk production device 110 has iteratively provided a plurality of CAT inputs 140 to the CAT 130, received a plurality of CAT outputs 150 from the CAT 130, and stored a plurality of ordered pairs 160 comprising ordered pairs of keyed function inputs and corresponding keyed function outputs.

It is appreciated that the DVD 120 alone, without the other elements depicted in FIG. 1A, comprises an alternative preferred embodiment of the present invention.

Reference is now made to FIG. 1C, which depicts the system of FIG. 1B, after the disk production device 110 has encrypted the plurality of ordered pairs 160, thereby producing an encrypted plurality of ordered pairs 170. The encryption algorithm is typically AES, for example, but not limited to, AES with a cryptographic 128 bit key. However, it will be appreciated by those ordinarily skilled in the art that the encryption algorithm can be any suitable encryption algorithm. The encryption key is stored on the DVD 120 in a way which makes the stored encryption key accessible to authorized devices. For example, and without limiting the generality of the foregoing, the stored encryption key may be embedded in a MKB.

The disk production device 110 encrypts the plurality of ordered pairs 160 using an encryption algorithm and an encryption key as agreed upon by the production facility 100 and by the manufacturers of DVD players (such as a DVD player 200 of FIGS. 2A-2D below). The encryption key is known to the production facility 100 and is either known to authorized DVD players or stored on DVD media in a way which makes it accessible to authorized devices, such as a DVD player 200 of FIGS. 2A-2D below. For example, and without limiting the generality of the foregoing, the encryption key may be embedded in a MKB.

Reference is now made to FIG. 1D, which depicts the system of FIG. 1C after the disk production device 110 has written the encrypted plurality of ordered pairs 170 onto the DVD 120. It is appreciated that the encrypted plurality of ordered pairs 170 can be written either to the medium control area (not shown) of the DVD 120, or to the medium content area 135 of the DVD 120, as described in more detail below.

Figure 1E:
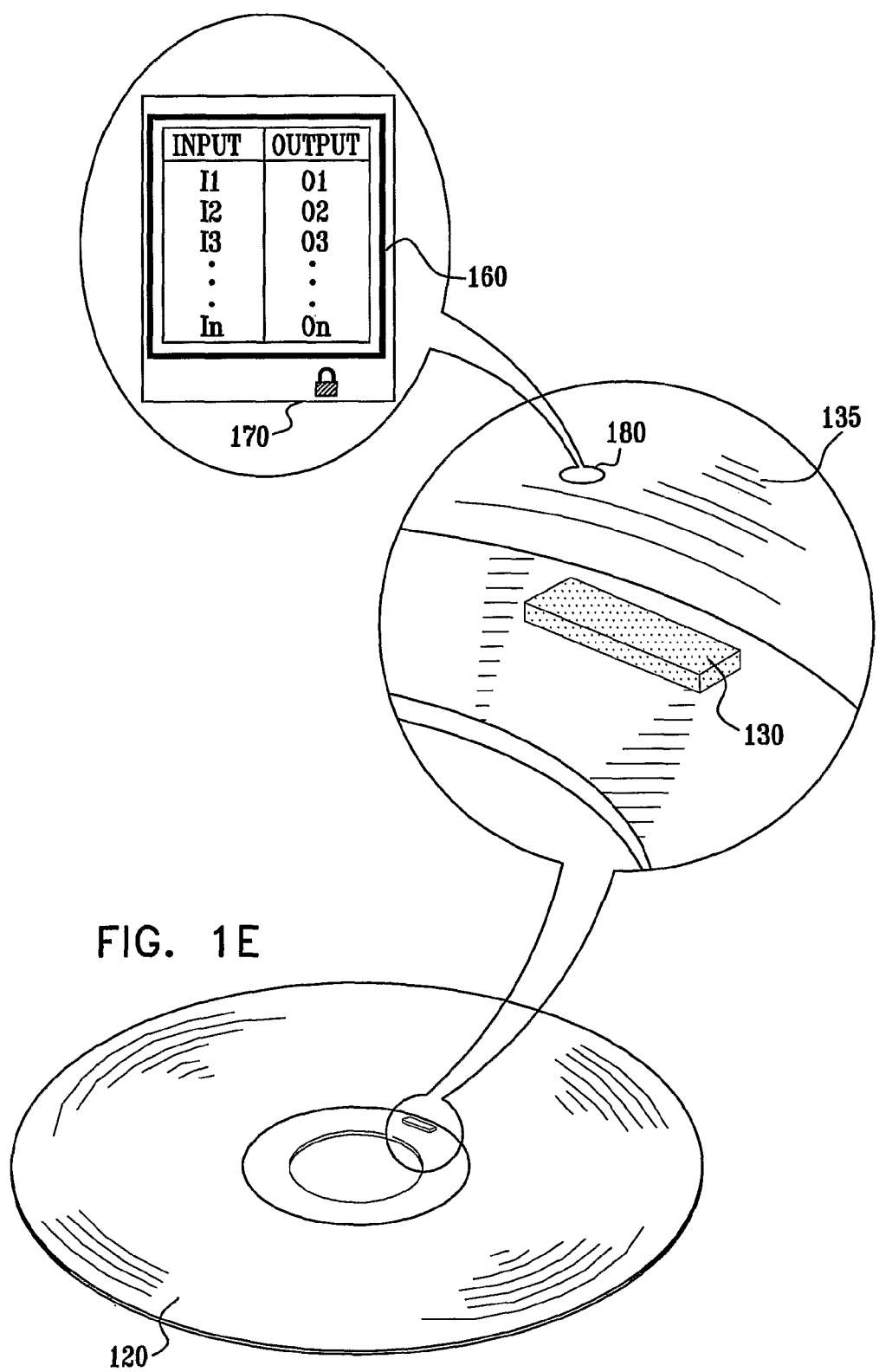
FIG. 1E is a simplified partly pictorial, partly block diagram illustration of a medium produced by the system of FIGS. 1A-1D, the medium comprising an alternative preferred embodiment of the present invention.

Reference is now made to FIG. 1E which is a simplified partly pictorial, partly block diagram illustration of a medium produced by the system of FIGS. 1A-1D, the medium comprising an alternative preferred embodiment of the present invention.

FIG. 1E depicts the DVD 120 of FIG. 1D and the encrypted plurality of ordered pairs 170 in the location 180 of the medium content area 135 of the DVD 120. It is appreciated that the DVD 120 of FIG. 1E comprises an alternative preferred embodiment of the present invention.

Persons skilled in the art will appreciate that the order of operations described with reference to FIGS. 1A-1E may be changed. For example, and without limiting the generality of the foregoing, instead of creating an unencrypted plurality of ordered pairs 160 (FIG. 1B) and subsequently encrypting the ordered pairs 160 (FIG. 1B) to produce an encrypted plurality of ordered pairs 170 (FIG. 1C), an alternative preferred embodiment creates a plurality of encrypted ordered pairs (not shown) by separately encrypting each ordered pair of keyed function input and keyed function output.

In one alternative preferred embodiment of the present invention, the plurality of encrypted ordered pairs (not shown) are written to the medium control area (not shown) of the DVD 120.

In another alternative preferred embodiment of the present invention, the plurality of encrypted ordered pairs (not shown) is written to the medium content area 135 of the DVD 120, preferably interleaved with stored content.

In yet another alternative preferred embodiment of the present invention, a first portion of the plurality of encrypted ordered pairs (not shown) are written to the medium control area (not shown) of the DVD 120, and a second portion of the plurality of encrypted ordered pairs are written to the medium content area 135 of the DVD 120.

It is appreciated that when a portion of the plurality of encrypted ordered pairs (not shown) is written to the medium content area 135 of the DVD 120, the portion may be written together, or the portion may be written in several locations within the medium content area 135 of the DVD 120.

In still another alternative preferred embodiment of the present invention, the production facility 100 produces only digital storage devices, such as the DVD 120, comprising tokens such as the CAT 130. The production of the ordered pairs is done by an authorized writing device, such as a DVD writer (not shown) at some other location. The other location, for example, and without limiting the generality of the foregoing, can be a DVD writer in a private home, or at a content manufacturer's place of business.

Reference is now made to FIGS. 2A-2D, which are simplified, partly pictorial, partly block diagram illustrations depicting a preferred system for determining whether a response from the medium of FIG. 1E is a correct response. FIGS. 2A-2D depict a DVD and a DVD player by way of a non-limiting example of a medium and a device for accessing data stored on the medium.

Figure 2A:
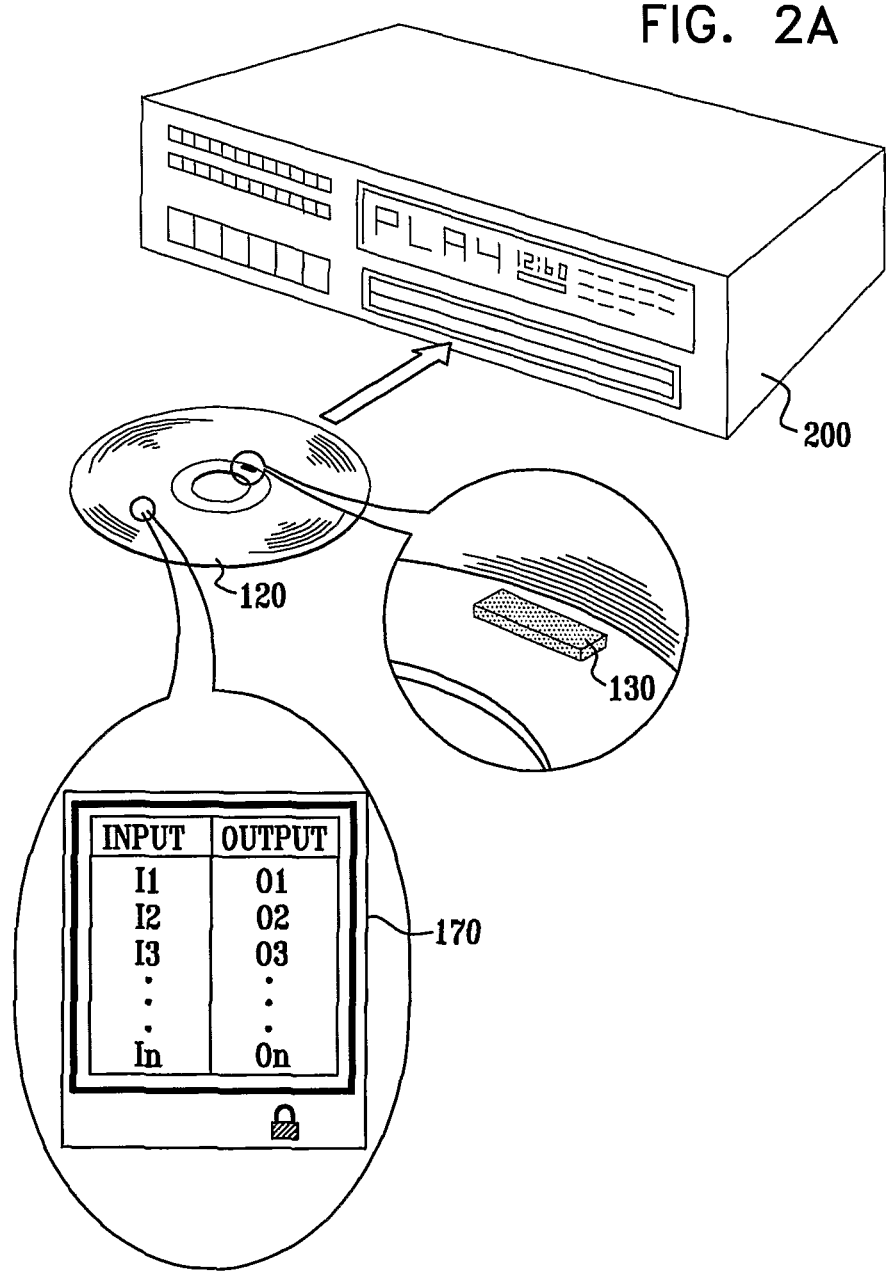
FIGS. 2A-2D are simplified partly pictorial, partly block diagram illustrations depicting a preferred system for determining whether a response received from the medium of FIG. 1E is a correct response.

FIG. 2A depicts a DVD player 200, using a DVD 120 such as the DVD 120 of FIG. 1E. The DVD 120 is inserted into the DVD player 200, starting the process of obtaining a response from the DVD 120 and determining whether the response is a correct response.

Figure 2B:
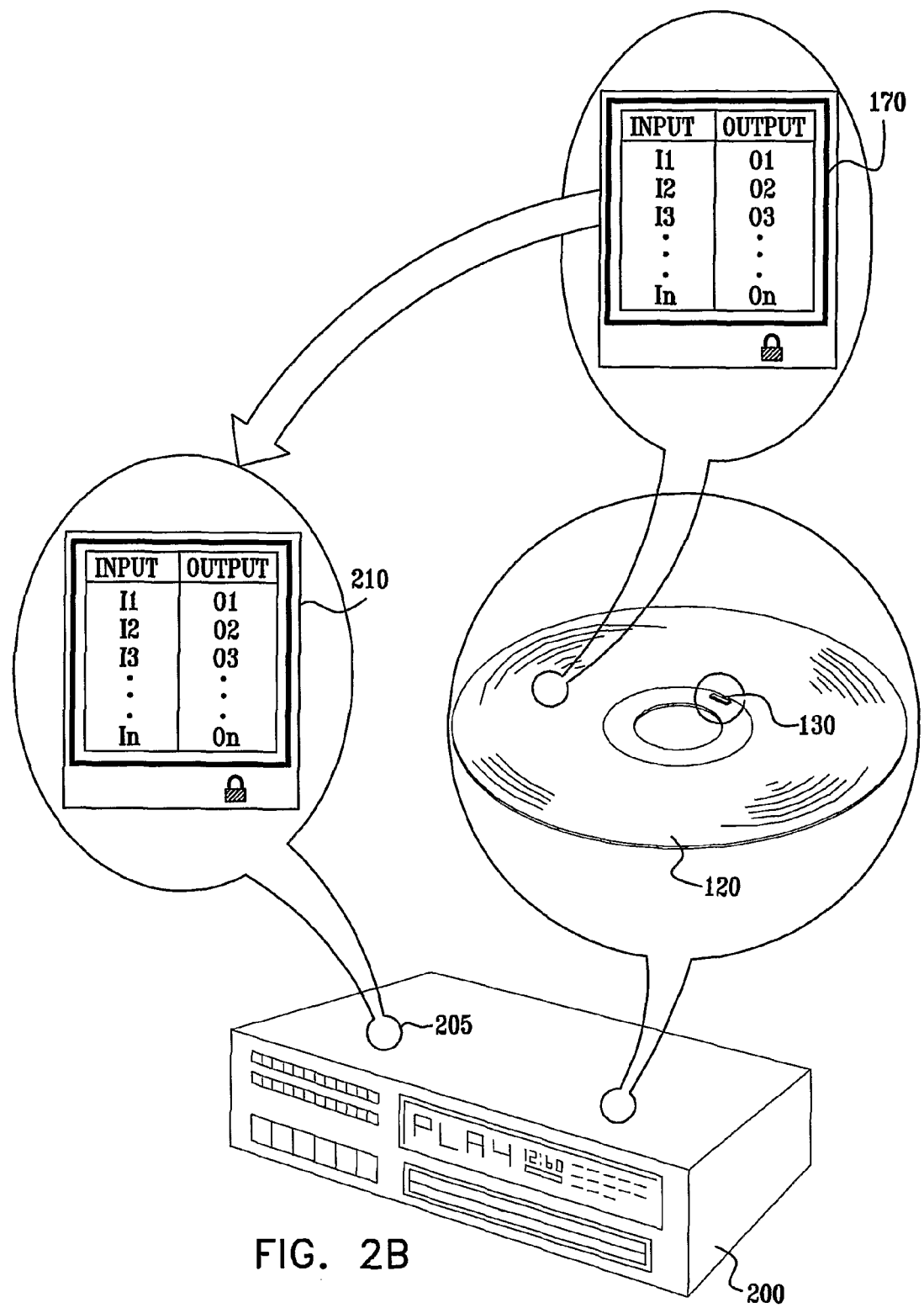

FIG. 2B depicts the system of FIG. 2A in a state where the encrypted plurality of ordered pairs 170 has been read from the DVD 120 by the DVD player 200 and stored as an encrypted plurality of ordered pairs 210 in a memory storage sub unit 205 of the DVD player 200. It is appreciated that memory storage sub units such as the memory storage sub unit 205 are well known in the art, and the depiction herein of the memory storage sub unit 205 is only symbolic.

Figure 2C:
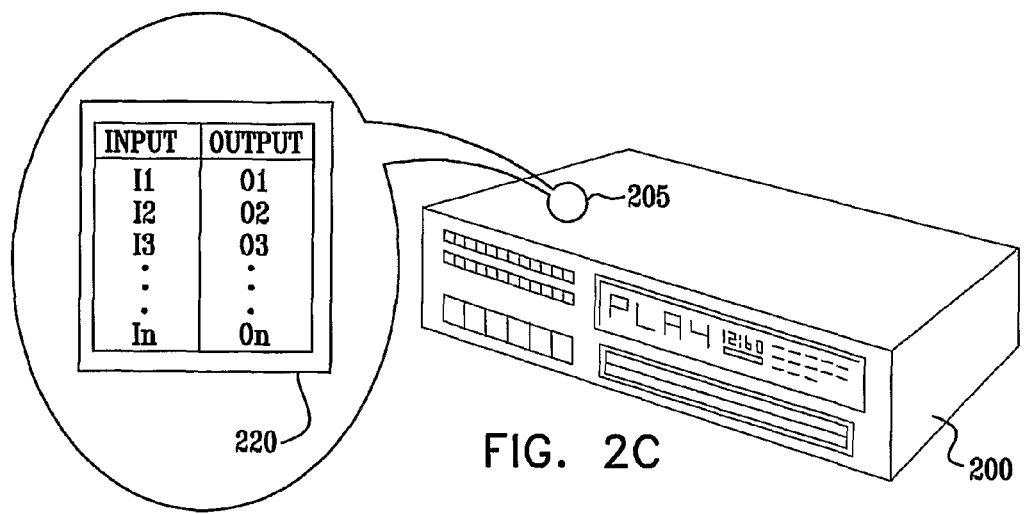

FIG. 2C depicts the system of FIG. 2B in a state where the DVD player 200 has decrypted the encrypted plurality of ordered pairs 170, producing a plurality of ordered pairs 220, and stored the plurality of ordered pairs 220 in the memory storage sub unit 205. The DVD player 200 decrypts the encrypted plurality of ordered pairs 170 using an algorithm as known at the production facility 100 (FIGS. 1A-1D) and at the DVD player 200, as described above. By way of a non-limiting example, for purpose of simplicity of description, a symmetric encryption scheme in which the encryption key and algorithm are known both at the production facility 100 and at the DVD player 200 is used. An asymmetric encryption scheme can also be used, where the production facility 100 encrypts with a private key, and the DVD player 200 decrypts with a public key corresponding to the private key. In preferred embodiments of the present invention, the DVD player 200 derives the public key from a MKB, using one or more device keys which the DVD player 200 has in advance, as is well known in the art.

Figure 2D:
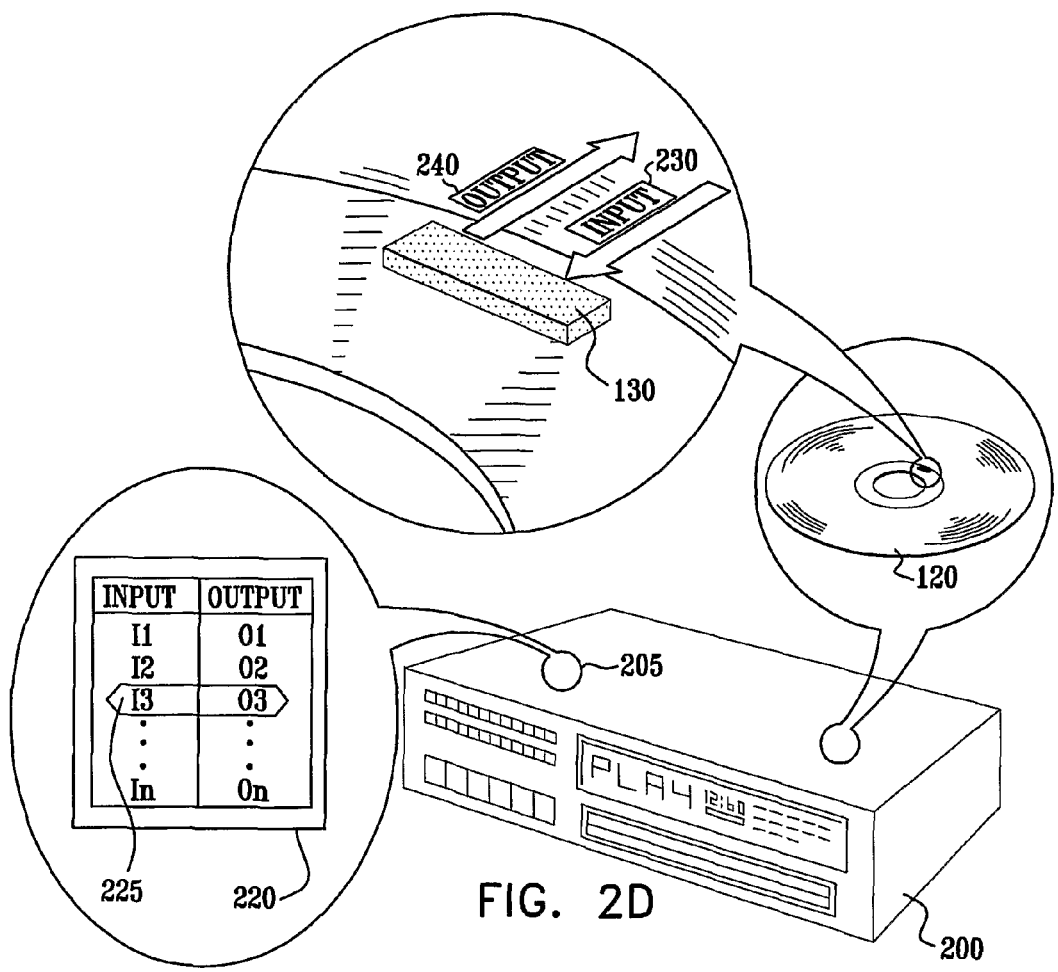

FIG. 2D depicts the system of FIG. 2C in a state where the DVD player 200 selects an ordered pair 225 from the plurality of ordered pairs 220, reads a keyed function input (not shown) which is an "input" member of the ordered pair 225, converts the keyed function input (not shown) to a CAT input 230, sends the CAT input 230 to the CAT 130, receives a CAT output 240 from the CAT 130, and obtains a keyed function output (not shown) which corresponds to the CAT output 240.

The DVD player 200 compares the keyed function output (not shown) to the "output" member of the ordered pair 225. If the keyed function output (not shown) from the CAT 130 is equal to (or, especially in the case where the CAT 130 comprises an analog token, substantially equal to) the "output" member of the ordered pair 225, the DVD player 200 determines that the response of DVD 120 is correct. A decision that the response of DVD 120 is correct is preferably based on a CAT Acceptance Policy (CAP), and may require providing more than one CAT input 230 to the CAT 130; receiving more than one CAT, output 240; and comparing the corresponding keyed function outputs to corresponding "output" members of the ordered pairs 225. CAT Acceptance Policy is discussed in more detail below in reference to FIG. 3A.

Persons skilled in the art will appreciate how to adapt the methods of communication between a chip on a disk and a player, described in the PCT Patent Application WO 99/38162 referenced above, for use in the system of FIG. 2D.

Persons skilled in the art will appreciate that some storage media such as, without limiting the generality of the foregoing, ZIP® disks and backup tapes, comprise both moving and stationary parts; other storage media, such as DVDs and CDs, comprise only moving parts. In the case of storage media such as a DVD 120 (FIG. 2B), the reading of the encrypted plurality of ordered pairs 170 (FIG. 2B) is done while the storage media is moving (revolving). Therefore it is preferred to use a CAT 130 (FIG. 2B) which is operative to accept inputs and provide outputs while the storage media is revolving. If a CAT 130 (FIG. 2B) is used which cannot accept inputs and provide outputs while the storage media is revolving, two alternative preferred options exist:

1) The DVD player 200 (FIG. 2B) may read the encrypted plurality of ordered pairs 170 (FIG. 2B) from the DVD 120 (FIG. 2B) while the DVD 120 (FIG. 2B) is revolving, after which the DVD 120 (FIG. 2B) may be stopped in order to provide inputs 230 (FIG. 2D) and receive outputs 240 (FIG. 2D) from the CAT 130 (FIG. 2D).

2) The DVD player 200 (FIG. 2B) may provide a pre-agreed set of inputs (not shown) to the CAT 130 (FIG. 2B) and receive outputs (not shown) from the CAT 130 (FIG. 2B) before causing the DVD 120 (FIG. 2B) to revolve. The pre-agreed set of inputs is a set of inputs pre-agreed and known to the production facility 100 (FIG. 1A) and the manufacturers of the DVD player 200 (FIG. 2A).

The selection of the ordered pair 225 from the plurality of ordered pairs 220 preferably occurs according to a CCSS. The CCSS may be a default CCSS which is known to the DVD player 200 prior to the DVD 120 being inserted into the DVD player 200, or it may be a CCSS which is written on the DVD 120 and read by the DVD player 200. The CCSS is preferably encrypted with any appropriate encryption method (such as, for example, AES) and a key which is known to the DVD player 200. The CCSS is preferably authenticated, using any appropriate method, (such as, for example, HMAC-AES or RSA-1024) with an authentication key which is known to the DVD player 200.

In a preferred embodiment of the present invention the CAT Challenge Selection Strategy (CCSS) is noted simply as a set of numbers using a pre-defined syntax, such as, for example, and without limiting the generality of the foregoing, "[0.2, {0.1, 0.2, 0.3, 0.4}]". The example given presumes the existence of a pool, or set, of CAT pairs, comprising 4 sub-pools of CAT pairs. The set of numbers and delimiters above are decoded, for example, into the following strategy: "select a real CAT pair with probability 0.2 and a false CAT pair with probability 1−0.2=0.8 (see the definition of a false CAT pair below). In selecting the real pair, select the real CAT pair from sub-pool 1 with probability 0.1, from sub-pool 2 with probability 0.2, from sub-pool 3 with probability 0.3 and from sub-pool 4 with probability 0.4. Within each sub-pool, the CAT pair should be randomly selected".

The determination by DVD player 200 that the response of the CAT 130 of DVD 120 is correct preferably occurs according to a CAP. A preferred CAP typically requires obtaining a plurality of keyed function inputs and keyed function outputs as follows:

providing a plurality of keyed function inputs corresponding to a plurality of "input" members of a plurality of ordered pairs;

providing a plurality of CAT inputs, corresponding to the plurality of keyed function inputs, to the CAT 130;

receiving a plurality of CAT outputs from the CAT 130;

obtaining a plurality of keyed function outputs corresponding to the plurality of CAT outputs; and comparing the plurality of keyed function outputs to a plurality of corresponding "output" members of the ordered pairs.

Possible preferred CAPs comprise one of the following:
requiring all of the above referenced comparisons to be equal;
requiring the percentage of the above referenced comparisons which are equal to be above a certain threshold;
requiring inputs to be provided and outputs to be compared until a sufficient number of comparisons are found to be equal; and
requiring any other appropriate measure of success.

Figure 3A:
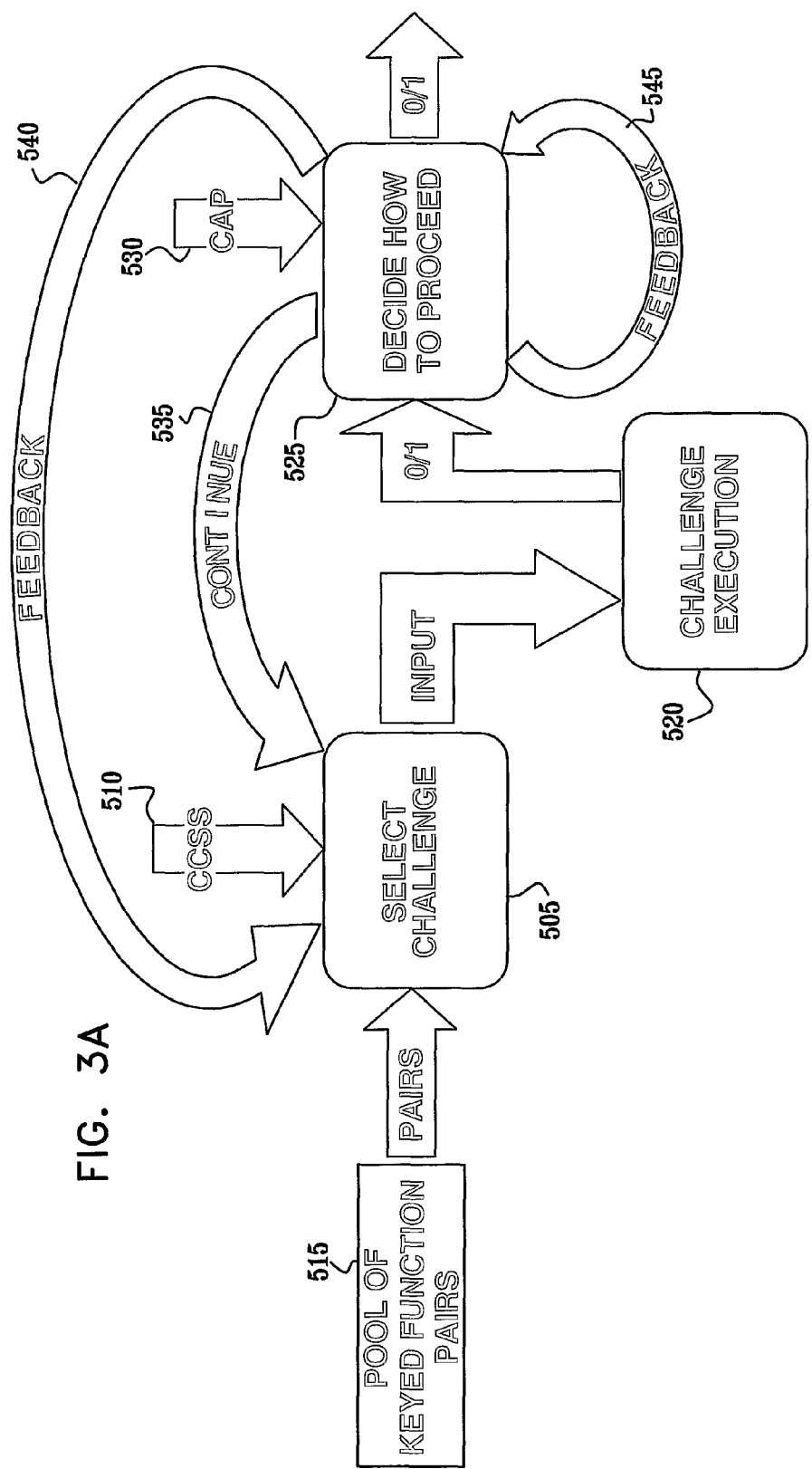
FIG. 3A is a simplified block diagram illustration depicting in more detail a preferred method of determining whether a response from the medium of FIG. 1E is a correct response.

Reference is now made to FIG. 3A, which is a simplified block diagram illustration depicting in more detail a preferred method of determining whether a response (output) from a medium of FIG. 1E is a correct response. FIG. 3A describes in detail a preferred method of interaction of the CAT Challenge Selection Strategy (CCSS) and the CAT Acceptance Policy (CAP), as defined above.

A select challenge block 505 communicates with a CCSS 510 and with a pool of keyed function pairs 515, comprising at least one keyed function pair. The select challenge block 505 uses the CCSS 510 to select a keyed function pair for authenticating a CAT (not shown) through a challenge-response process; the challenge being a keyed function input member of the keyed function pair. The challenge is sent to the CAT (not shown), by performing a challenge execution 520, as follows. The challenge execution 520 converts the keyed function input to a CAT input, suitable for input to a CAT, and provides the CAT input to the CAT (not shown).

Upon return of a response to the challenge by the CAT (not shown), the challenge execution 520 converts the response to a keyed function output, and sends a result of the challenge execution, 0 or 1, "success" or "failure", to a decide how to proceed block 525. The decide how to proceed block communicates with a CAP 530, uses the CAP 530 to decide whether to communicate a continue message 535 to the select challenge block 505, and whether to communicate 0 or 1 ("success" or "failure") as the result of the authentication.

A feedback mechanism 540 updates the policies used by the select challenge block 505. By way of a non-limiting example, when the pairs are divided into pools of pairs, the CCSS 510 may require one successful challenge from a first pool of pairs and five successful challenges from a second pool of pairs, after which the result of the challenge from the first pool of pairs is reported through FEEDBACK 540 to the select challenge block 505. The select challenge block 505 selects whether to continue with the challenges of the first pool of pairs, if the previous challenge failed, or to move on to the challenges of the second pool of pairs, if the previous challenge was successful.

Another feedback mechanism 545 updates the policies used by the decide how to proceed block 525, based on the result of the challenge execution 520. For example, if the CAP 530 requires success in seven out of ten trials, the result of a challenge is reported by the challenge execution 520 to the decide how to proceed block 525, which changes the current acceptance policy, from requiring seven successes in ten trials, to requiring six successes in nine remaining trials, if the challenge was successful, or to requiring seven successes in nine remaining trials if the challenge failed.

It is appreciated that each of the policies coming from the CAP 530 and the CCSS 510 may be a default CAP or a default CCSS, as defined above, or an attached CAP or an attached CCSS, as defined above. It is also to be appreciated that each of the policies coming from the CAP 530 and the CCSS 510 may contain triggers causing a CAP or a CCSS to be exchanged for a different CAP coming from the CAP 530 or a different CCSS coming from the CCSS 510.

A preferred embodiment for a CAP comprises a time limit for the elapsed time between a challenge and a response.

In a preferred embodiment of the present invention the pool of CAT pairs 515 comprises false CAT pairs as well as actual CAT pairs. A false CAT pair comprises a pair of values from a range of values possible for a real CAT pair, wherein the "response" member of the pair is not a true response to the "challenge" member of the pair. The reason for using occasional, randomly distributed, false pairs is to prolong the usefulness of the series of non-repeating real CAT pairs. An attacker eavesdropping on communication between a DVD player and a DVD would not be able to distinguish between false CAT pairs and real CAT pairs. The selection of a false CAT pair (not shown) from the pool of CAT pairs 515 is preferably according to a CCSS. When a false CAT pair is selected, the challenge member of the pair is used by the select challenge block 505 to provide an input to the challenge execution 520, but the CAP 530 ignores the result provided by the challenge execution 520 to the decide how to proceed block 525.

It is appreciated that triggering signals may preferably be embedded, or interleaved, within content stored on a DVD. The content is read from the DVD by a DVD player, which decrypts the content. Preferably, while processing the content, the DVD player identifies a triggering signal, and interprets the triggering signal as an instruction to invoke an authentication challenge-response procedure, upon which the DVD player preferably activates the select challenge 505. In a preferred embodiment of the present invention the triggering signal causes any of the actions below upon receipt thereof by the DVD player 200 (as will be further detailed below):
  the start of a response authentication process;
  the use of false CAT pairs;
  a change of CAP; and
  a change of CCSS.

The DVD player 200 recognizes the triggering signal as a control packet, and causes a control unit (not shown) comprised in the DVD player 200 to handle the control packet, and invoke an appropriate response from the list above.

In a preferred embodiment of the present invention CAT pairs, CAPs, CCSSs, and triggering signals as described above are embedded interleaved with content on the storage media, making it more difficult for malicious users to separate the content from the protection.

Figure 3B:
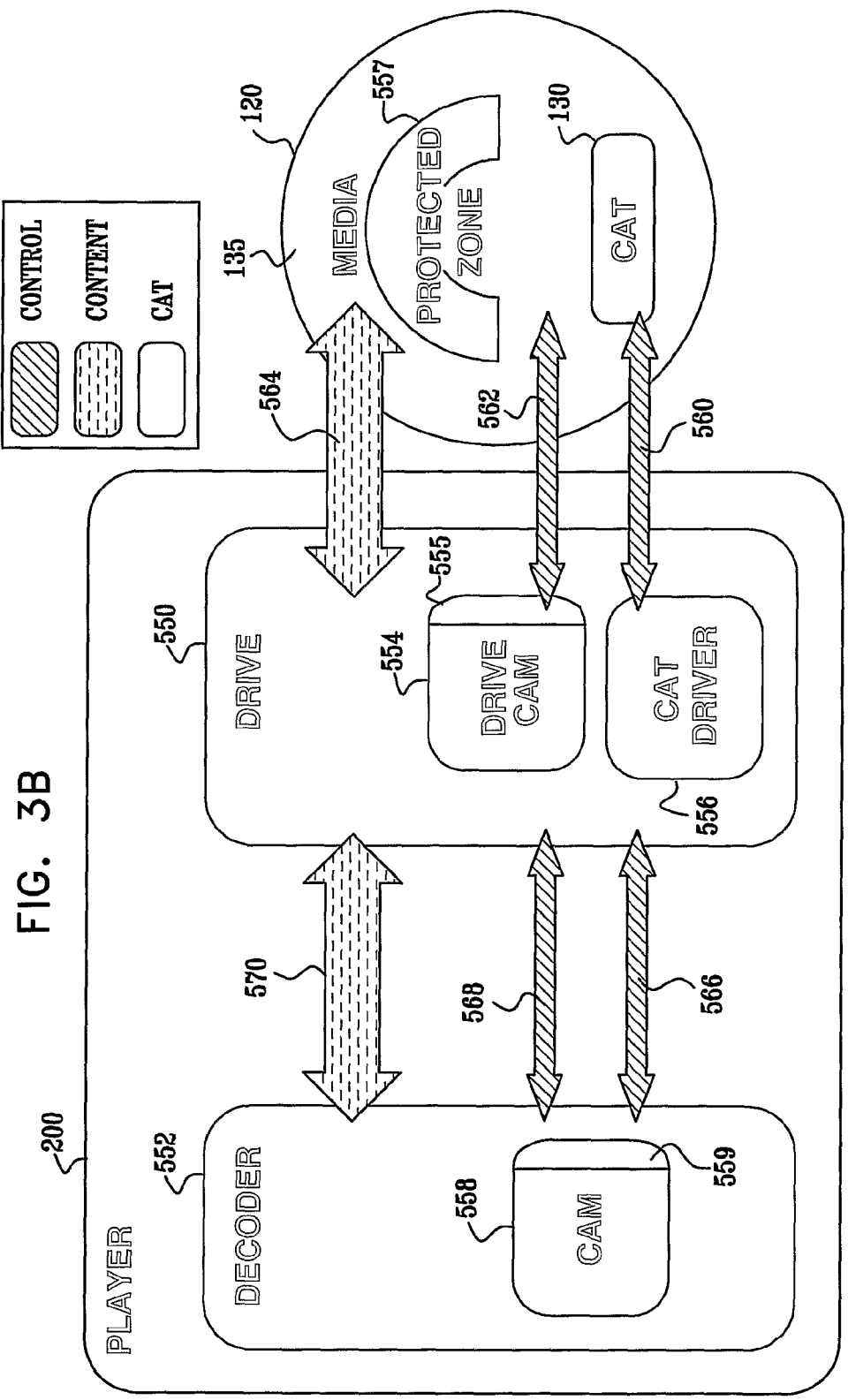
FIG. 3B is a functional block diagram illustration depicting in more detail a preferred embodiment of a DVD player constructed and operative in accordance with an alternative preferred embodiment of the present invention.

Reference is now made to FIG. 3B, which is a functional block diagram illustration depicting in more detail a preferred embodiment of a DVD player constructed and operative in accordance with a preferred embodiment of the present invention. FIG. 3B depicts a DVD player 200 and a DVD 120. FIG. 3 additionally contains a legend depicting three types of components and three types of data depicted in the drawing: components of the CAT and its related data; control components and related control data; and content data.

The DVD 120 comprises a CAT 130, a medium control area 557, and a medium content area 135.

The DVD player 200 of FIG. 3B comprises two functional modules: a decoder 552 and a drive 550.

The drive 550 is a module whose function is to read data from the DVD 120. The drive 550 comprises two functional modules: a drive CAM (Conditional Access Module) 554, which is preferably a secure module, and a CAT driver 556. The CAT driver 556 is a functional module in communication with the CAT 130, as depicted by an arrow 560. It is the CAT driver 556 which sends inputs to the CAT 130 and receives outputs from the CAT 130. The arrow 560 depicts communication of control data from the CAT 130 to the CAT driver 556. Another arrow 562 depicts communication of control data between the drive CAM 554 and the DVD 120, said control data residing either in the medium control area of the DVD 120 or in the medium content area 135 of the DVD 120. The drive CAM 554 handles control data, a portion of which is related to CAT data, as indicated by a portion 555 of the drive CAM 554 which indicates the presence of CAT data. An additional arrow 564 connects the DVD 120 to the drive 550, depicting the communication of content from the medium content area 135 to the drive 550.

The decoder 552 is the functional module which processes the data which is read by the drive 550. The processing comprises decryption, if data is encrypted, and decompression, if the data is compressed. The decoder 552 comprises a decoder CAM 558 (Conditional Access Module). The decoder CAM 558 provides security services to the decoder 552, such as, for example, and without limiting the generality of the foregoing, storage of keys, enforcement of policies, decryption, and authentication. An arrow 566 depicts communication of control data between the CAT driver 556 and the decoder CAM 558. Another arrow 568 depicts communication of control data between the drive CAM 554 and the decoder CAM 558. Yet another arrow 570 depicts the communication of content from the drive 550 to the decoder 552. The CAM 558 handles control data, a portion of which is related to CAT data, as indicated by a portion 559 of the CAM 558 which indicates the presence of CAT data.

The drive CAM 554 comprises a CAT-aware module 555, and the decoder CAM 558 comprises a CAT-aware module 559. The CAT-aware modules are preferably logical modules, for handling CAT pairs and CAT related data.

It is appreciated that content is communicated between the DVD 120 and the drive 550, and between the drive 550 and the decoder 552.

It is appreciated that control data is communicated from the DVD 120 to the drive CAM 554, and from the drive CAM 554 to the decoder CAM 558. Control data is also communicated from the decoder CAM 558 through the CAT driver 556 to the CAT 130, for example, and without limiting the generality of the foregoing, in order to perform authentication.

Reference is now made to FIG. 3C which is a functional block diagram illustration depicting in more detail the flow of data and content in the preferred embodiment depicted in FIG. 3B.

FIG. 3C depicts content 590 and CAT pairs 580 stored on a DVD 120. Each CAT pair 580 comprises a CAT input 582 and a CAT output 584. The content 590 and the CAT pairs 580 are communicated through a drive 550 to a decoder 552, as depicted by a "pipeline" 592. The decoder 552 stores the CAT pairs 580. A decoder CAM 558 sends the CAT inputs 582 to the drive 550. A CAT driver 556 comprised in the drive 550 sends the CAT inputs 582 to a CAT 130. The CAT driver 556 receives the CAT outputs 584. The drive 550 sends the CAT outputs 584 to the decoder 552. The decoder CAM 558 compares the CAT outputs 584 to the stored outputs in the corresponding stored CAT pairs 580.

Referring back to FIGS. 1A-3C, in some preferred embodiments of the present invention a CAT is implemented in an analog fashion. An example, without limiting the generality of the foregoing, of an analog CAT, referred to herein as a "bubble token", is described in a PhD thesis entitled "Physical One-Way Functions" by Pappu Srinivasa Ravikanth of MIT, referenced above and incorporated herein by reference.

Briefly, the "bubble token" is a transparent piece of plastic with bubbles embedded therein. When a laser beam is directed onto the bubble token, it creates a unique 2D light pattern on a receiver which is located on a side of the token opposite to the laser beam. The physical CAT accepts, as analog inputs, the angle of penetration of the laser beam into the "bubble token" and the location of the penetration of the laser beam into the "bubble token". The analog output of the CAT is a two dimensional light pattern which falls on a receiver.

A digital input for the "bubble token" example comprises digital values for the analog CAT input, which are: an angle of penetration of the laser beam into the "bubble token"; and the location of the penetration of the laser beam into the "bubble token". The analog CAT output is a two dimensional light pattern which falls on a light receiver. The digital output of the keyed function is a digital encoding of the analog CAT output. The digital encoding is preferably a noise-reducing encoding scheme, namely an encoding scheme that maps substantially equal analog CAT outputs to identical digital outputs. "Substantially equal analog CAT outputs" in this context means that the difference between two substantially equal analog CAT outputs is below the ability of the analog physical measurement to discern. A non-limiting example of substantially equal analog CAT outputs can be two different two dimensional light patterns, slightly different in size, which can be caused by small changes in the distance of the laser beam from the token.

It is appreciated that mechanisms suitable for conversion of the analog inputs (an angle and a location) and analog output (a two-dimensional light pattern on a receiver) of the "bubble token" to digital form are well known in the art.

Other preferred embodiments of the present invention, in which a CAT is implemented as a digital chip connected to a DVD, are now described. Communication between the CAT and the DVD player is achieved through a wireless channel such as a Radio Frequency (RF) channel. An RF antenna on a DVD and in a DVD player is rather inexpensive, as witnessed by the common use of RFID chips to mark inexpensive products.

Yet other alternative preferred embodiments of the present invention, in which a CAT is implemented as a digital chip connected to a DVD, provide communication between the digital chip and the DVD player through connectors located in the center of the storage device and on the drive spindle.

Still other preferred embodiments of the present invention, comprising a CAT implemented as a digital chip connected to a DVD, provide communication between the digital chip and the DVD player through letting the digital chip produce information communicated via the DVD reading mechanism. By way of a non-limiting example, such communication is implemented by use of a product named OpSecure referenced above. OpSecure is an optical disk and smart card hybrid technology, allowing a digital chip to receive, store, process, and transmit information, without changing the firmware of the DVD player. Implementing an OpSecure CAT requires no additional mechanism in the DVD player, so changes required to DVD players are inexpensive. Changes required to DVDs comprising the OpSecure CAT are relatively expensive, making each DVD relatively expensive.

Persons skilled in the art will appreciate that in the preferred embodiments described above, the data communicated between the DVD player and its components and the CAT can be encrypted, for example, and without limiting the generality of the foregoing, by using AES with an encryption key which is shared by the CAT and the drive of the DVD player.

Persons skilled in the art will appreciate how to adapt the methods of communication between a chip on a disk and a player, described in the PCT Patent Application WO 99/38162 referenced above, for use in the preferred embodiments described above.

Reference is now made to FIGS. 4A-4D which are simplified partly pictorial, partly block diagram illustrations depicting an alternative preferred system for producing a medium comprising a token and storing an encrypted plurality of ordered pairs, the medium being constructed and operative in accordance with an alternative preferred embodiment of the present invention.

Figure 4B:
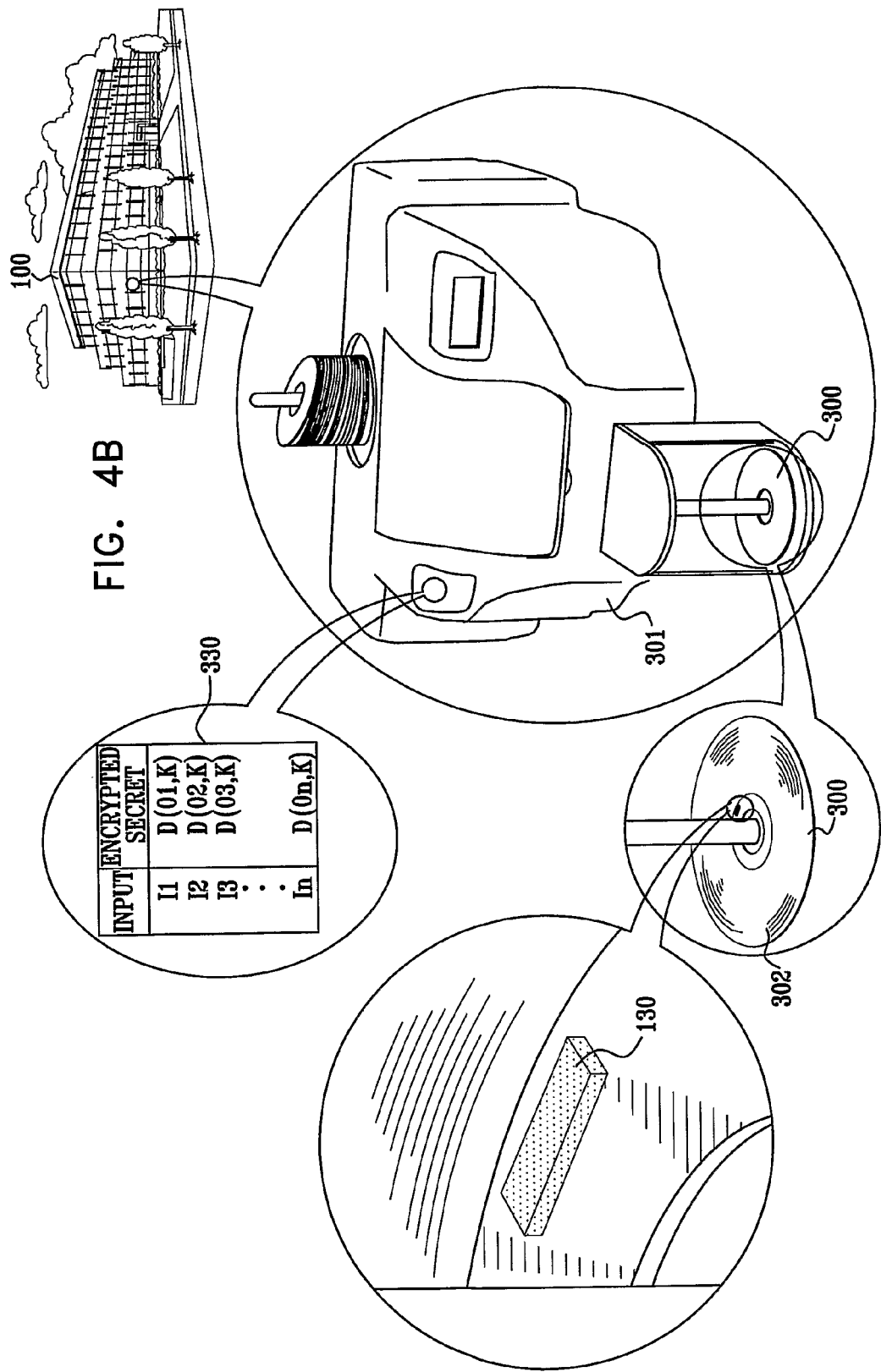
Figure 4D:
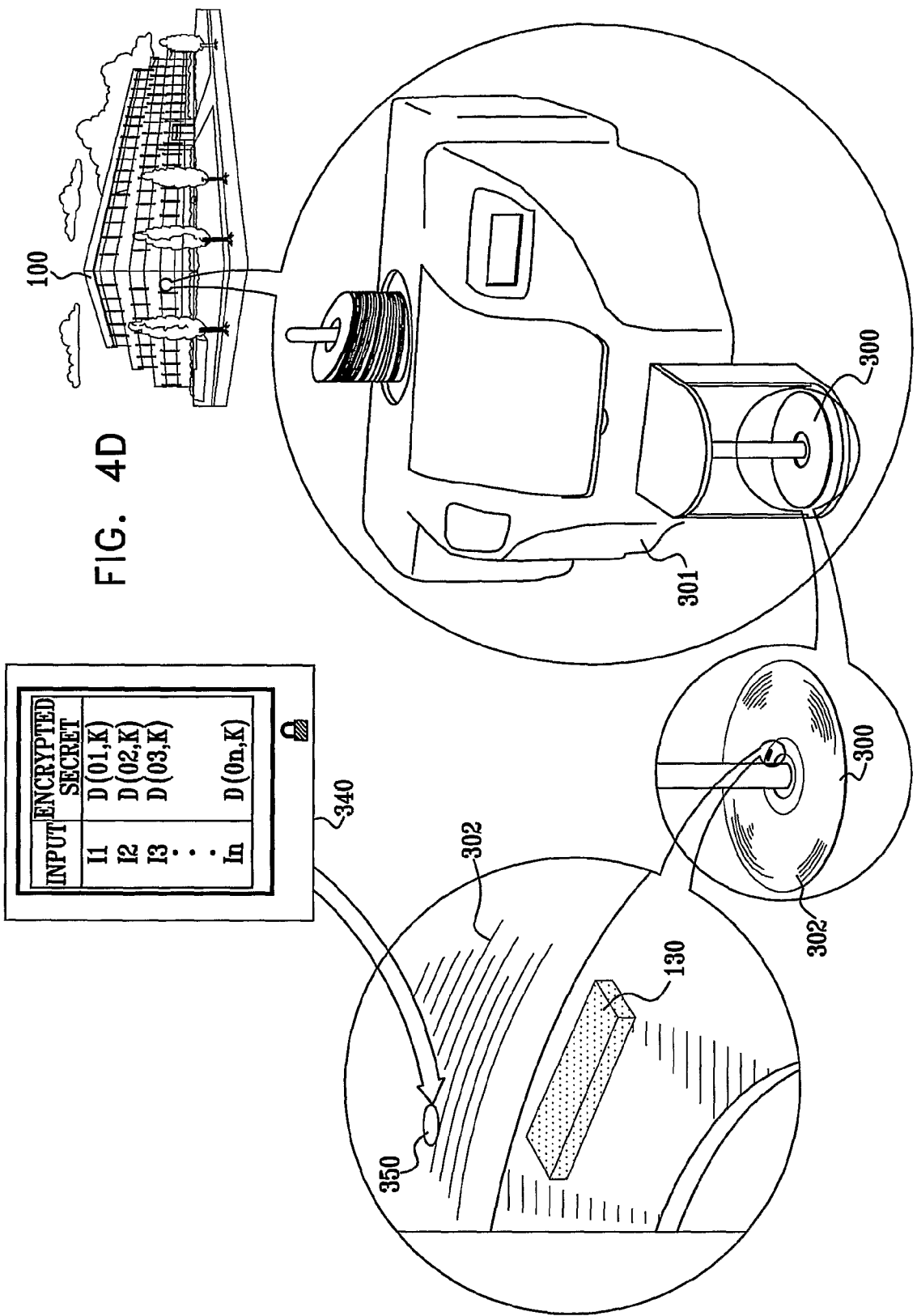
Figure 4E:
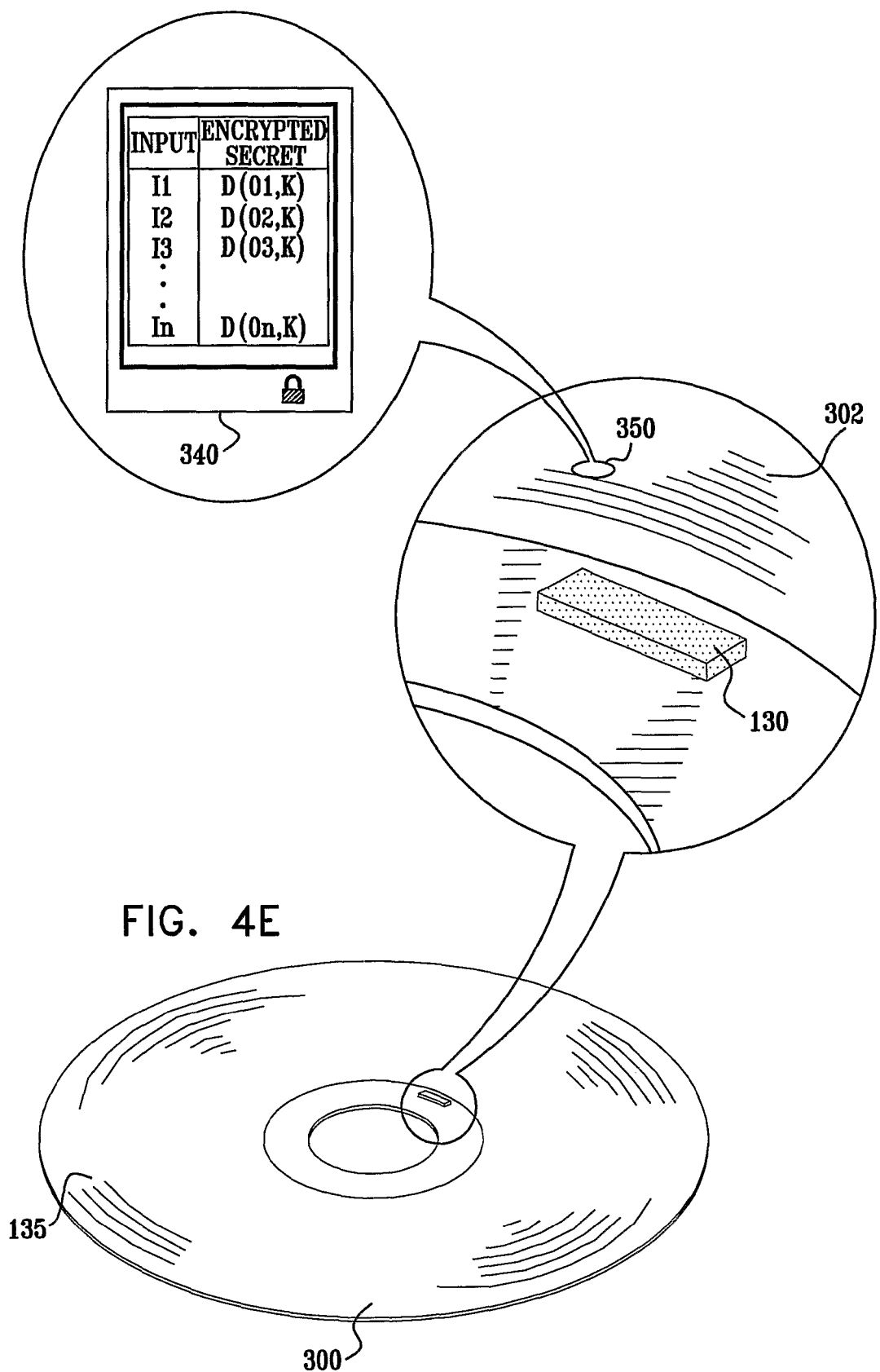
FIG. 4E is a simplified partly pictorial, partly block diagram illustration of the medium produced by the system of FIGS. 4A-4D.

Reference is also made to FIG. 4E, which is a simplified partly pictorial, partly block diagram illustration of a medium produced by the system of FIGS. 4A-4D. It is appreciated that the DVD 300 of FIG. 4E comprises an alternative preferred embodiment of the present invention.

FIGS. 4A-4E relate to a case where a disk production device is used to store an encrypted plurality of ordered pairs on a medium, and wherein the ordered pairs comprise:

a first keyed function input; and the result of computing a second keyed function on the following two variables: the output of the first keyed function corresponding to the output of the CAT, and a secret.

By way of a non-limiting example, the secret can be a cryptographic decryption key.

FIGS. 4A-4E depict a DVD, by way of a non-limiting example of a medium.

The encryption keys mentioned herein may be device keys or content keys or both.

It is appreciated that device keys are provided from a pool of device keys.

It is appreciated that the content keys can be identical to the device keys; however, preferably, the content keys are not identical to the device keys. Content keys are written to the medium, preferably to a protected zone on the medium, when a protected zone is available. By way of a non-limiting example, the content keys are preferably written to a Media Key Block (MKB). The content keys which are written onto the medium are encrypted with device keys or with a combination of intermediate keys derived from the device keys and from additional, auxiliary, data written on the medium. Such additional, auxiliary, data may be written in the MKB described by the CPPM and AACS references mentioned above.

In the preferred embodiment described by FIGS. 4A-4E the content keys written onto the medium are encrypted with device keys of authorized playing devices, so only authorized devices may recover the content keys. The content keys are preferably embedded in a MKB.

In an alternative preferred embodiment of the present invention the content keys written onto the medium are encrypted with device keys of authorized playing devices, and are not embedded in a MKB.

In preferred embodiments of the present invention, different parts of the content, such as different titles, different sectors, different records, different streams, and so forth, are encrypted with different content keys. Any part of the content on a medium can be encrypted with zero or more keys, possibly using secondary and tertiary encryption.

FIGS. 4A-4E relate to a case where a secret is stored on a medium, in a way which only authorized devices can recover, such as, by way of a non-limiting example, in a MKB. It is appreciated that all of the content on a medium may be encrypted, only a portion of the content may be encrypted, or even none of the content may be encrypted. Storing secrets in a way which only authorized devices can recover is well known in the art.

FIG. 4A is a simplified partly pictorial, partly block diagram illustration depicting a production facility 100, a disk production device 301, and a DVD 300, all of FIG. 1A. The production facility 100 is not part of the current invention, and is depicted solely in order to illustrate a typical setting where the current invention may be produced. The disk production device 301 further comprises a secret K 303, an invertible function D(X, Y) 305 which has an associated inverse function $D^{-1}(Z, W)$ 307. The invertible function $D(X, Y)$ 305 and its associated inverse function $D^{-1}(Z, W)$ 307 are such that for a first parameter A, and for every second parameter B, $D^{-1}(A, D(A, B))=B$. An exemplifying pair of D and $D^{-1}$ is $D=D^-$ =XOR, where for every A and B, XOR(A, XOR(A, B))=A XOR A XOR B=B. In preferred embodiments of the present invention the production facility comprises also the associated inverse function $D^{-1}$.

The DVD 300 preferably comprises a CAT 130, a medium control area (not shown) and a medium content area 135. The CAT 130 is operative to receive CAT inputs and produce CAT outputs.

The disk production device 301 is preferably operative to iteratively:
 provide an input (not shown) to a keyed function;
 use the input (not shown) to produce a corresponding CAT input 310;
 provide the CAT input 310 to the CAT 130;
 receive a CAT output 150 from the CAT 130;
 produce an output (not shown) of the keyed function corresponding to the CAT output 150; and
 calculate D(keyed function output, secret K 303), producing a result, thus iteratively producing a plurality of ordered pairs of keyed function inputs and corresponding results, and to store the plurality of ordered pairs, as described in more detail below.

Reference is now made to the disk production device 301, providing a keyed function input (not shown), producing a CAT input 310 corresponding to the keyed function input (not shown), providing the CAT input 310 to the CAT 130 of the DVD 300, receiving a CAT output 320 from the CAT 130 of the DVD 300, and producing the keyed function output (not shown) corresponding to the CAT output 320. The disk production device 301 produces an ordered pair comprised of:
 the keyed function input (not shown) to the CAT 130; and
 a result of calculating the invertible function $D(X, Y)$ 305 on the keyed function output (not shown) corresponding to the output 320 of the CAT 130 and the secret K 303.

Reference is now made to FIG. 4B, which depicts the system of FIG. 4A after the disk production device 301 has iteratively provided a plurality of keyed function inputs (not shown) to the CAT 130, received a plurality of CAT outputs 320 from the CAT 130, produced a plurality of keyed function outputs (not shown) and stored a plurality of ordered pairs 330 comprising ordered pairs of the keyed function input (not shown) and the result of calculating the invertible function $D(X, Y)$ 305 on the keyed function output (not shown) and the secret K 303 (FIG. 4A).

Reference is now made to FIG. 4C, which depicts the system of FIG. 4B after the disk production device 301 has encrypted the plurality of ordered pairs 330, producing an encrypted plurality of ordered pairs 340.

The disk production device 301 encrypts the plurality of ordered pairs 330 using an encryption algorithm as agreed upon by the production facility 100 and by the manufacturers of the DVD player 570 (FIGS. 5A-5D). By way of a non-limiting example, the encryption algorithm is AES with a cryptographic 128 bit key which is known to the production facility 100. In one preferred embodiment of the present invention, the key is also known to authorized DVD players 570 (FIGS. 5A-5D). In another preferred embodiment of the present invention, the key is embedded in a MKB and thus made accessible to authorized devices, as is well known in the art.

Reference is now made to FIG. 4D, which depicts the system of FIG. 4C after the disk production device 301 has written the encrypted plurality of ordered pairs 340 onto the DVD 300. The encrypted plurality of ordered pairs may be written in the medium content area, or in the medium control area, or in a suitable combination of both, as described in more detail above, with reference to FIGS. 1A-1E.

It is appreciated that the order of operations described with reference to FIGS. 4A-4D may be changed. For example, and without limiting the generality of the foregoing, instead of producing an unencrypted plurality of ordered pairs 330 (FIG. 4B) and subsequently encrypting the plurality of ordered pairs 330 (FIG. 4B) to produce an encrypted plurality of ordered pairs 340 (FIG. 4C), an alternative preferred embodiment may produce a plurality of encrypted ordered pairs (not shown) by separately encrypting each ordered pair.

It is appreciated that the plurality of ordered pairs 330 (FIG. 4B) may be written on the DVD 300 (FIG. 4D) in an unencrypted form (not shown).

Reference is now made to FIG. 4E, which depicts the DVD 300 of FIG. 4D and the encrypted plurality of ordered pairs 340 in the location 350 of the content storage area 302 of the DVD 300. It is appreciated that the DVD 300 of FIG. 4E comprises an alternative preferred embodiment of the present invention.

The present invention supports writing of content to a DVD in a non-secure environment, such as, by way of a non-limiting example, a DVD writer which writes content to a DVD RW media. Writing apparatus for writing to a DVD is not necessarily located in a production facility for DVDS.

In one preferred embodiment of the present invention a disk production device, such as the disk production device 301 of FIG. 4D, in a production facility such as production facility 100 of FIG. 4D, samples CAT pairs and writes the CAT pairs onto a DVD. The CAT pairs are written onto the DVD preferably in a pre-defined location, preferably encrypted, and preferably in the medium control area. The DVD is then provided to a writing apparatus, which may not be located in a production facility such as production facility 100 of FIG. 4D. The writing apparatus, is authorized, by way of possessing appropriate decryption keys for decrypting the CAT pairs to read the CAT pairs from the pre-defined location. The writing apparatus then writes content to the DVD, preferably encrypted, and preferably interleaved with the CAT pairs.

In an alternative preferred embodiment of the present invention a disk production device, such as the disk production device 301 of FIG. 4D, in a production facility such as production facility 100 of FIG. 4D, for DVDs, manufactures DVDs with no CAT pairs written upon them. When a DVD is placed into a writing apparatus, the writing apparatus performs CAT sampling and writes encrypted content interleaved with the CAT pairs just sampled. The disk production device has thus written protected content onto the DVD.

In another preferred alternative embodiment of the present invention combines a disk production device, such as the disk production device 301 of FIG. 4D, in a production facility such as production facility 100 of FIG. 4D, for DVDs samples CAT pairs and writes the CAT pairs onto the DVDs. Additionally, when a DVD is placed into an authorized writing apparatus, the authorized writing apparatus performs additional CAT sampling, adds new CAT pairs to the CAT pairs already stored on the DVD by the production facility, as an extended set of CAT pairs. The authorized writing apparatus interleaves the extended set of CAT pairs with content when it writes the content to the DVD.

In still another preferred embodiment of the present invention a combination of the above embodiments is present on a single DVD. Such a single DVD, for example, and without limiting the generality of the foregoing, is a DVD produced by a production facility, said DVD comprising:

pre-recorded protected content written at the production facility, protected by encryption with a key such as the key K 303 of FIG. 4A above;

pre-recorded protected content written at the production facility, protected an alternative method for protection of pre-recorded content on DVDs;

non-encrypted content written at the production facility;

content written by an authorized writing apparatus using some of the CAT pairs which were also used for protecting the pre-recorded protected content; and content written by an authorized writing apparatus using unused CAT pairs stored on the DVD at the production facility and also using new CAT pairs, sampled by the authorized writing apparatus before the writing.

Reference is now made to FIGS. 5A-5D, which are simplified partly pictorial, partly block diagram illustrations depicting a preferred system for computing a secret K from a response from the medium of FIG. 4E. FIGS. 5A-5D depict a DVD by way of a non-limiting example of a medium.

FIGS. 5A-5D relate to a case where a DVD player 570 computes a secret K stored on a DVD 300 based on an encrypted plurality of ordered pairs 340 which is stored on the DVD 300, a CAT 130 and a function $D^{-1}$. Each pair of the encrypted plurality of ordered pairs 340 comprises an "input" member and an "encrypted secret" member.

FIG. 5A depicts a DVD player 570, using a DVD 300 such as the DVD 300 of FIG. 4E. The DVD 300 is inserted into the DVD player 570, starting the process of obtaining a response from the DVD 300 and computing a secret K.

Figure 5B:
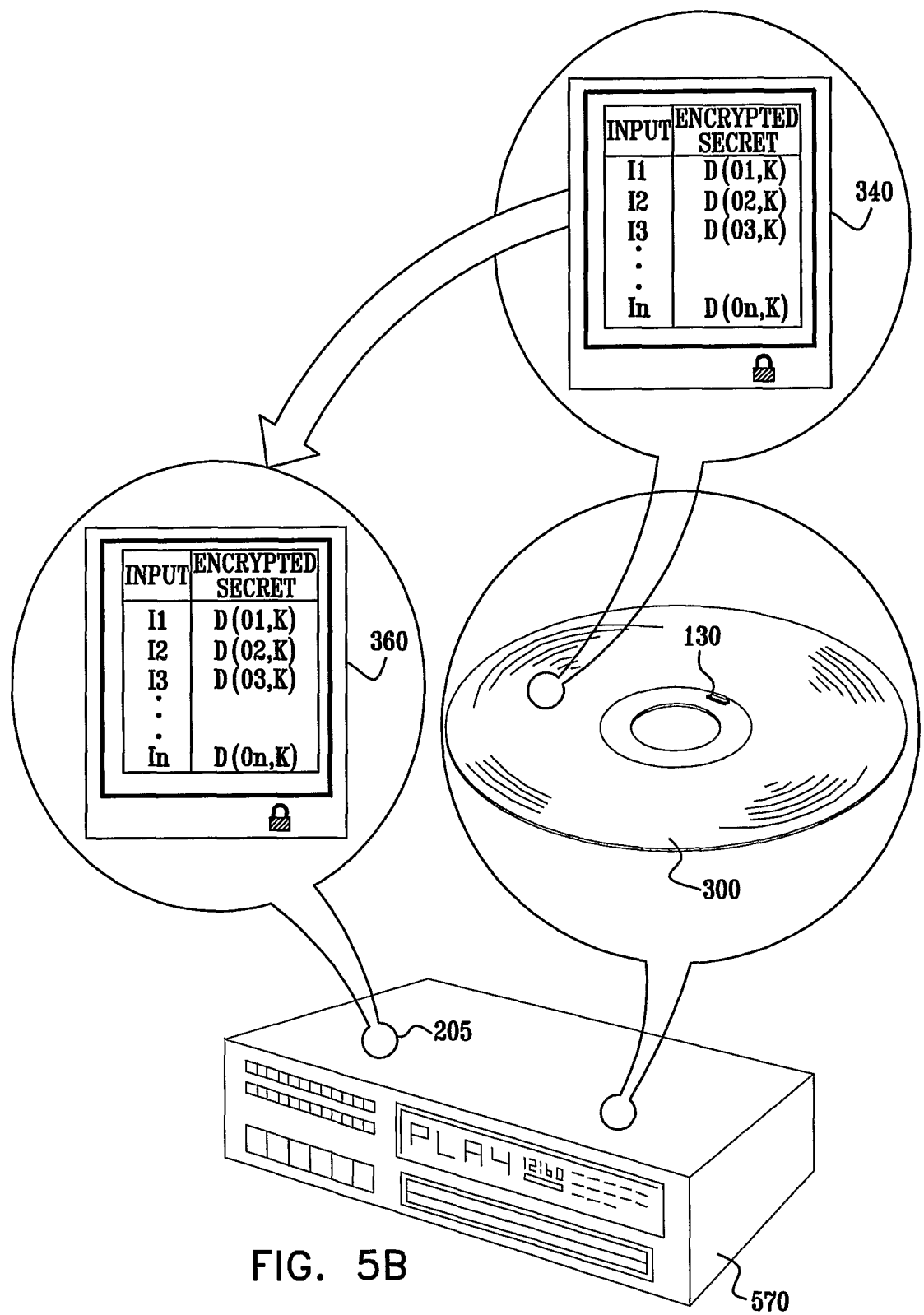

FIG. 5B depicts the system of FIG. 5A in a state where the encrypted plurality of ordered pairs 340 has been read from the DVD 300 and stored as an encrypted plurality of ordered pairs 360 in a memory storage sub unit 205 of the DVD player 570. It is appreciated that memory storage sub units such as the memory storage sub unit 205 are well known in the art, and the depiction herein of the memory storage sub unit 205 is only symbolic.

Figure 5C:
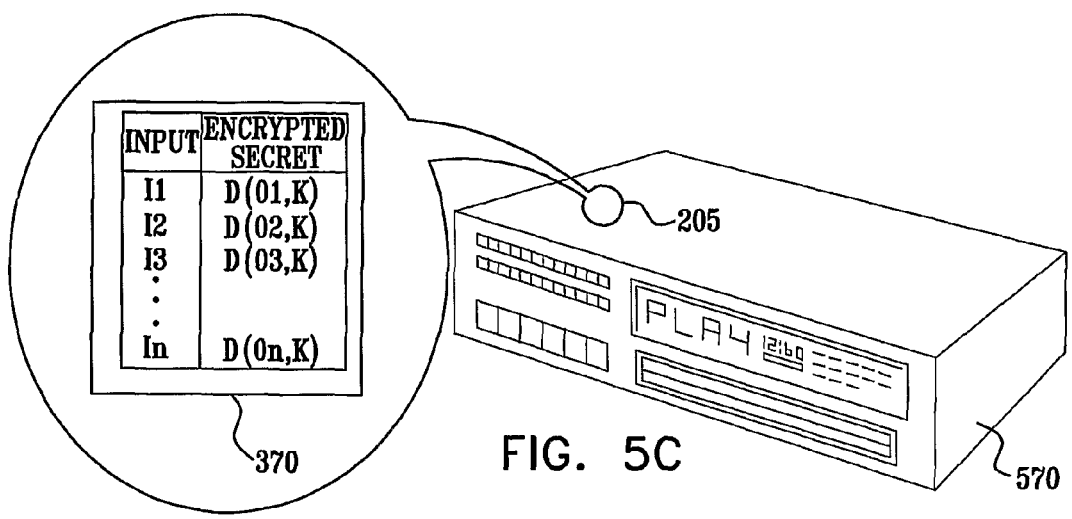

FIG. 5C depicts the system of FIG. 5B in a state where the DVD player 570 has decrypted at least part of the encrypted plurality of ordered pairs 340, producing a plurality of ordered pairs 370, and stored the plurality of ordered pairs 370 in the memory storage sub unit 205.

The DVD player 570 decrypts the encrypted plurality of ordered pairs 340 using a decryption key and algorithm as known at the production facility 100 (FIGS. 4A-4D) and the DVD player 570. The DVD player 570 preferably derives the decryption key from a MKB using at least one device key.

Figure 5D:
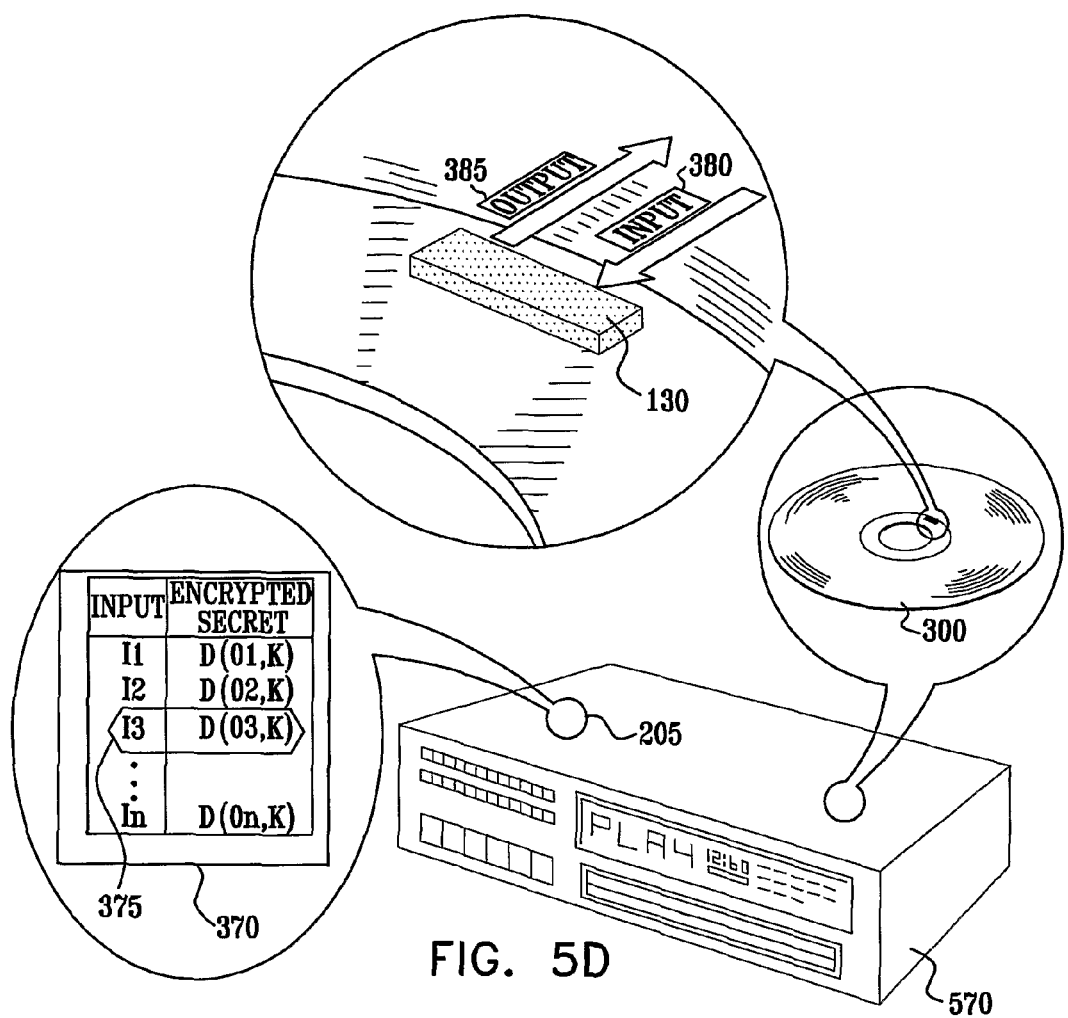

FIG. 5D depicts the system of FIG. 5C in a state where the DVD player 570 selects an ordered pair 375 from the plurality of ordered pairs 370, reads the "input" member of the ordered pair 375, sends a CAT input 380 corresponding to the keyed function input (not shown) which is the "input" member of the ordered pair 375, to the CAT 130 on the DVD 300, receives a CAT output 385 from the CAT 130 on the DVD 300, and produces the keyed function output (not shown) which corresponds to the CAT output 385. The DVD player 570 computes $D^{-1}$ (keyed function output, "encrypted secret" member of the ordered pair 375), which is equal to $D^{-1}$ (keyed function output, D(keyed function output, the secret K)), the result of the computation being the secret K.

Persons skilled in the art will appreciate that any suitable component of the DVD player 570 which handles either the unencrypted secret K or the unencrypted form of the protected contents of the DVD, should preferably be a secure component, preventing attackers from obtaining either the unencrypted secret K or the unencrypted contents of the DVD.

Persons skilled in the art will appreciate that some storage media such as, without limiting the generality of the foregoing, ZIP® disks and backup tapes comprise both moving and stationary parts, other storage media, such as DVDs and CDs, comprise only moving parts. In the case of storage media such as a DVD 300 (FIG. 5B), the reading of the encrypted plurality of ordered pairs 340 (FIG. 5B) is done while the storage media is moving (revolving). Therefore it is preferred to use a CAT 130 (FIG. 5B) which is operative to accept inputs and provide outputs while the storage media is revolving. If a CAT 130 (FIG. 5B) is used which cannot accept inputs and provide outputs while the storage media is revolving, two alternative preferred options exist:

1) The DVD player 570 (FIG. 5B) may read the encrypted plurality of ordered pairs 340 (FIG. 5B) from the DVD 300 (FIG. 5B) while the DVD 300 (FIG. 5B) is revolving, after which the DVD 300 (FIG. 5B) may be stopped in order to provide inputs 380 (FIG. 5D) and receive outputs 385 (FIG. 5D) from the CAT 130 (FIG. 5D).

2) The DVD player 570 (FIG. 5B) may provide a pre-agreed set of inputs (not shown) to the CAT 130 (FIG. 5B) and receive outputs (not shown) from the CAT 130 (FIG. 5B) before causing the DVD 300 (FIG. 5B) to revolve. The pre-agreed set of inputs is a set of inputs pre-agreed and known to the production facility 100 (FIG. 4A) and the manufacturers of the DVD player 570 (FIG. 5A).

Figure 6:
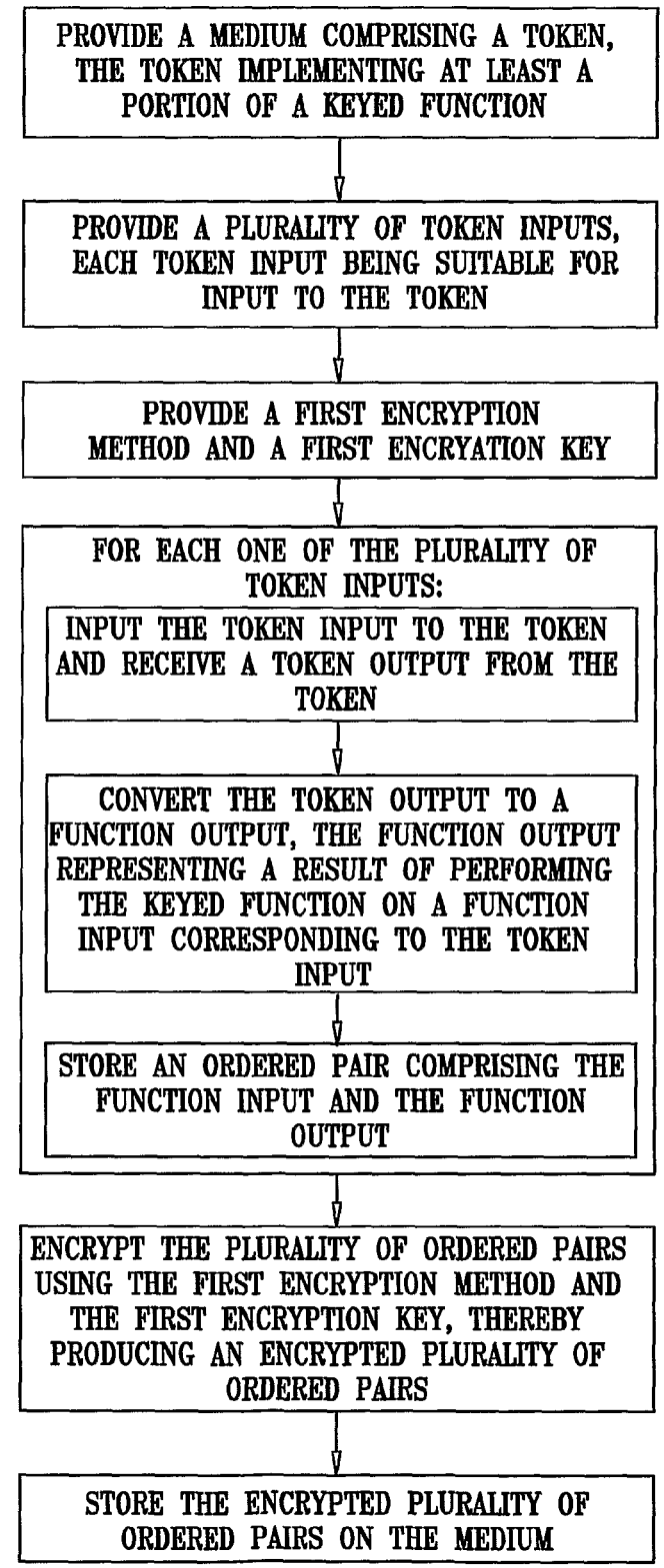
FIG. 6 is a simplified flowchart illustration of a preferred method of operation of the system of FIGS. 1A-1D, for producing the medium of FIG. 1E.

Reference is now made to FIG. 6, which is a simplified flowchart illustration of a preferred method of operation of the system of FIGS. 1A-1D, producing the medium of FIG. 1E. The method of FIG. 6 is self-explanatory in light of the above discussion.

Figure 7:
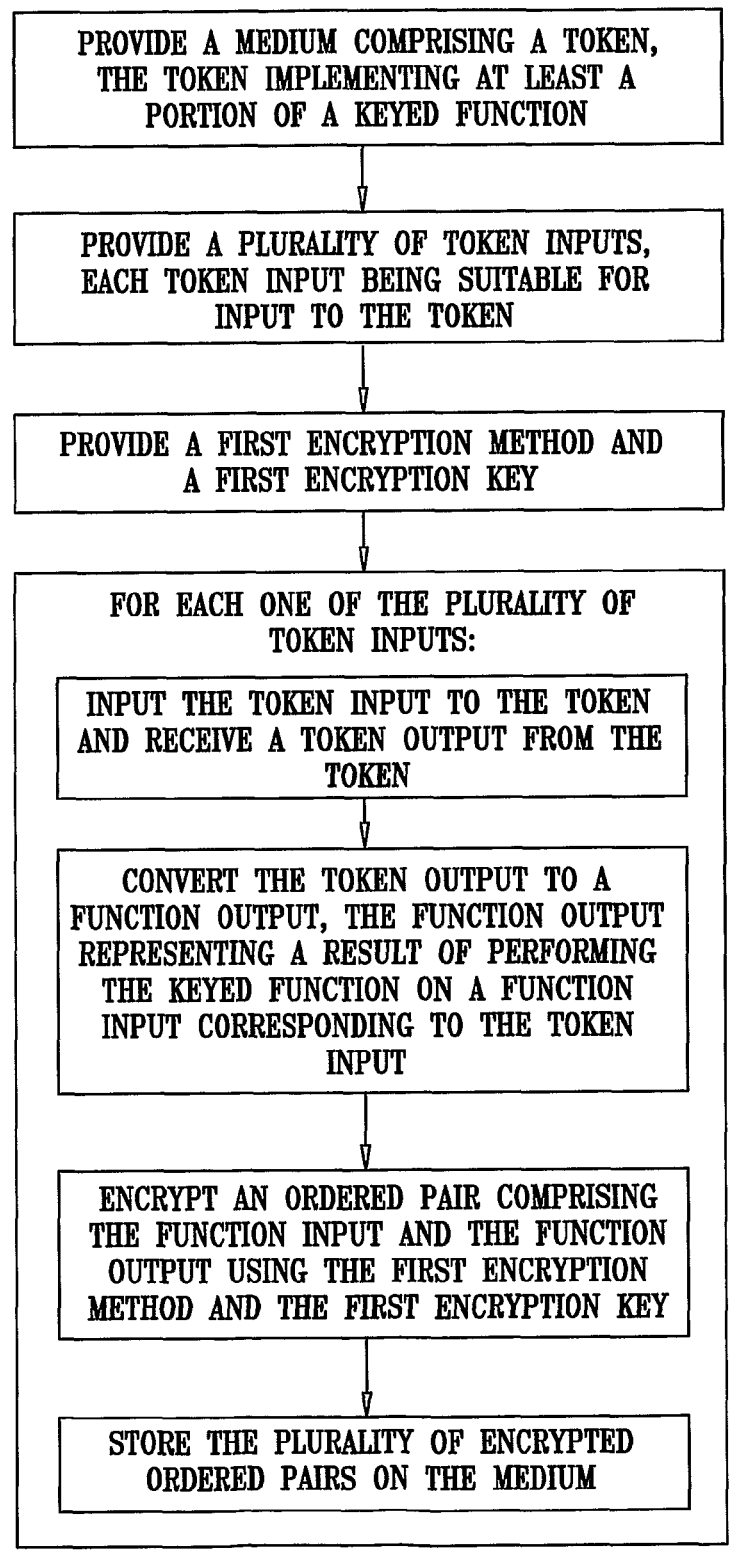
FIG. 7 is a simplified flowchart illustration of a method for producing another preferred embodiment of the medium of FIG. 1E.

Reference is now made to FIG. 7, which is a simplified flowchart illustration of a method for producing another preferred embodiment of the medium of FIG. 1E. The method of FIG. 7 is self-explanatory in light of the above discussion.

Figure 8:
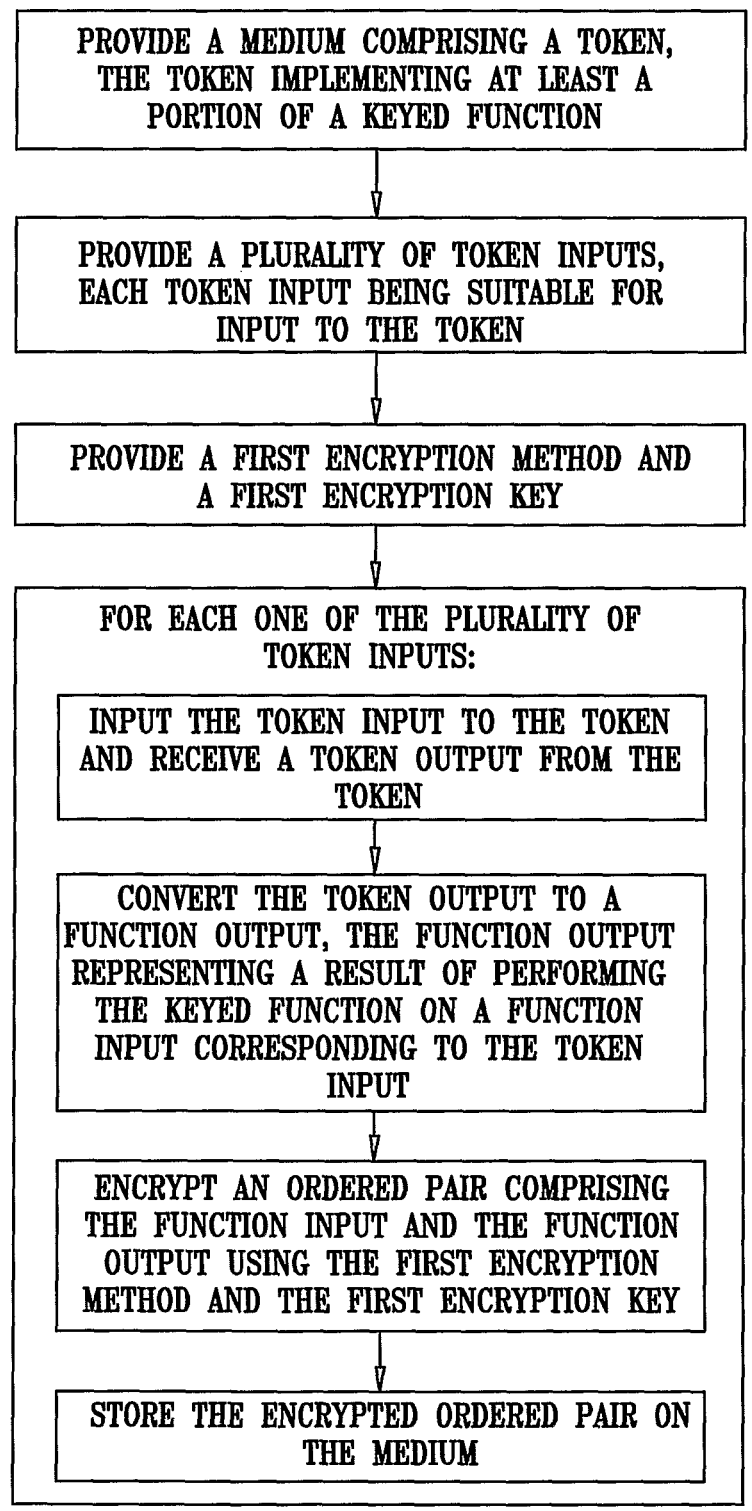
FIG. 8 is a simplified flowchart illustration of a method for producing still another preferred embodiment of the medium of FIG. 1E.

Reference is now made to FIG. 8, which is a simplified flowchart illustration of a method for producing still another preferred embodiment of the medium of FIG. 1E. The method of FIG. 8 is self-explanatory in light of the above discussion.

Figure 9:
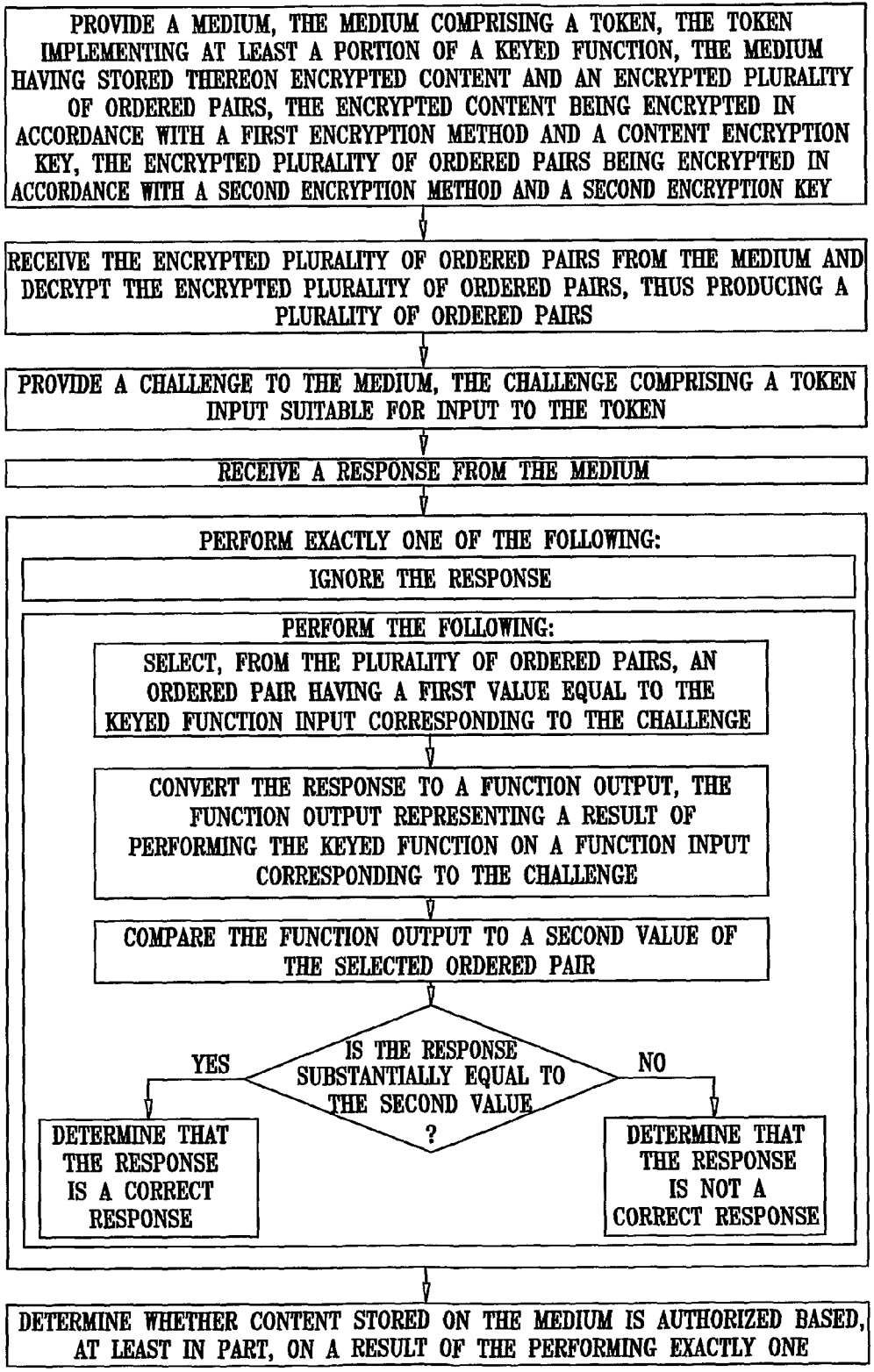
FIG. 9 is a simplified flowchart illustration of a preferred method of determining whether a response from the medium of FIG. 1E is a correct response.

Reference is now made to FIG. 9, which is a simplified flowchart illustration of a preferred method of determining whether a response from the medium of FIG. 1E is a correct response. The method of FIG. 9 is self-explanatory in light of the above discussion.

Figure 10:
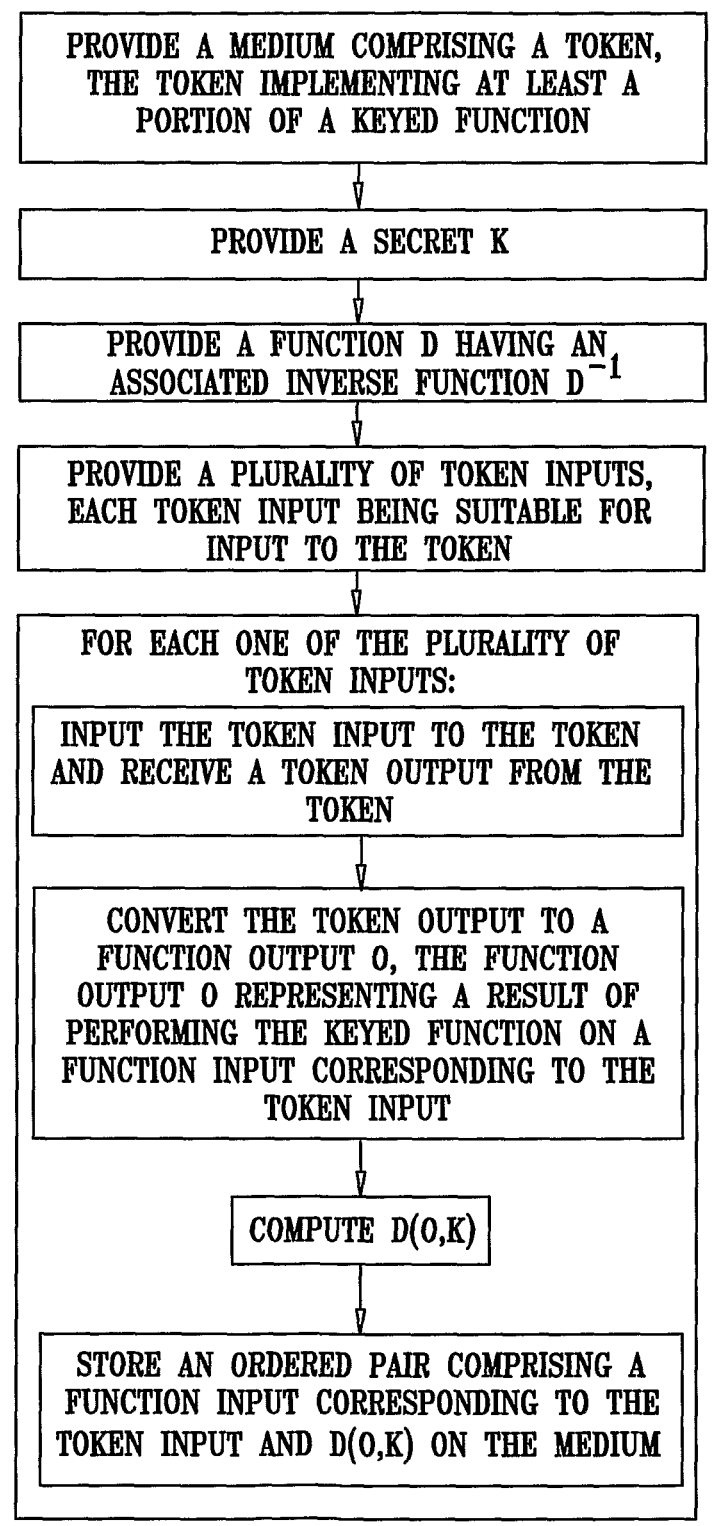
FIG. 10 is a simplified flowchart illustration of a alternative preferred method of producing the medium of FIG. 4E.

Reference is now made to FIG. 10, which is a simplified flowchart illustration of a preferred alternative method of producing the medium of FIG. 4E, storing ordered pairs which enable computing a secret K. The method of FIG. 10 is self-explanatory in light of the above discussion.

Figure 11:
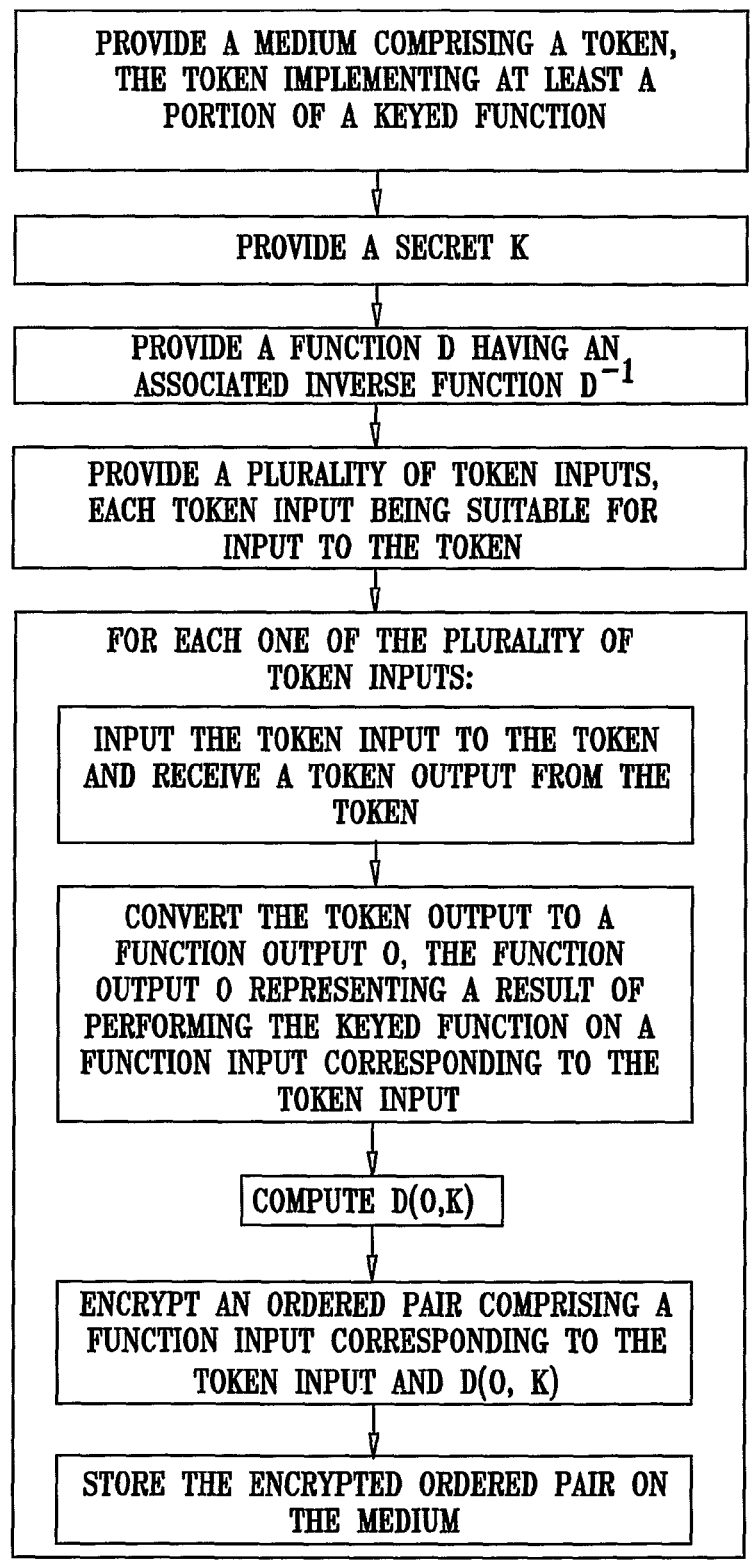
FIG. 11 is a simplified flowchart illustration of a method of producing another preferred embodiment of the medium of FIG. 4E.

Reference is now made to FIG. 11, which is a simplified flowchart illustration of a method of producing another preferred embodiment of the medium of FIG. 4E. The method of FIG. 11 is self-explanatory in light of the above discussion.

Figure 12:
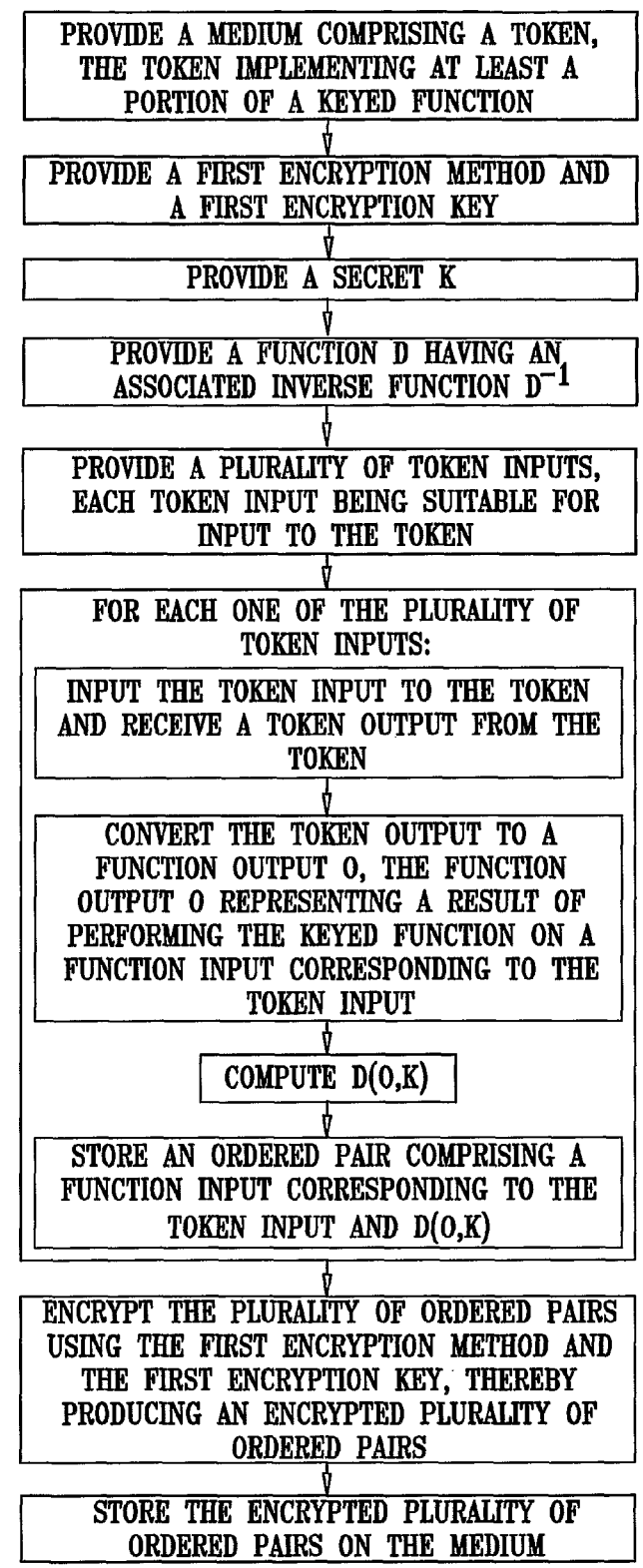
FIG. 12 is a simplified flowchart illustration of a method of producing still another preferred embodiment of the medium of FIG. 4E.

Reference is now made to FIG. 12, which is a simplified flowchart illustration of a method of producing still another preferred embodiment of the medium of FIG. 4E. The method of FIG. 12 is self-explanatory in light of the above discussion.

Figure 13:
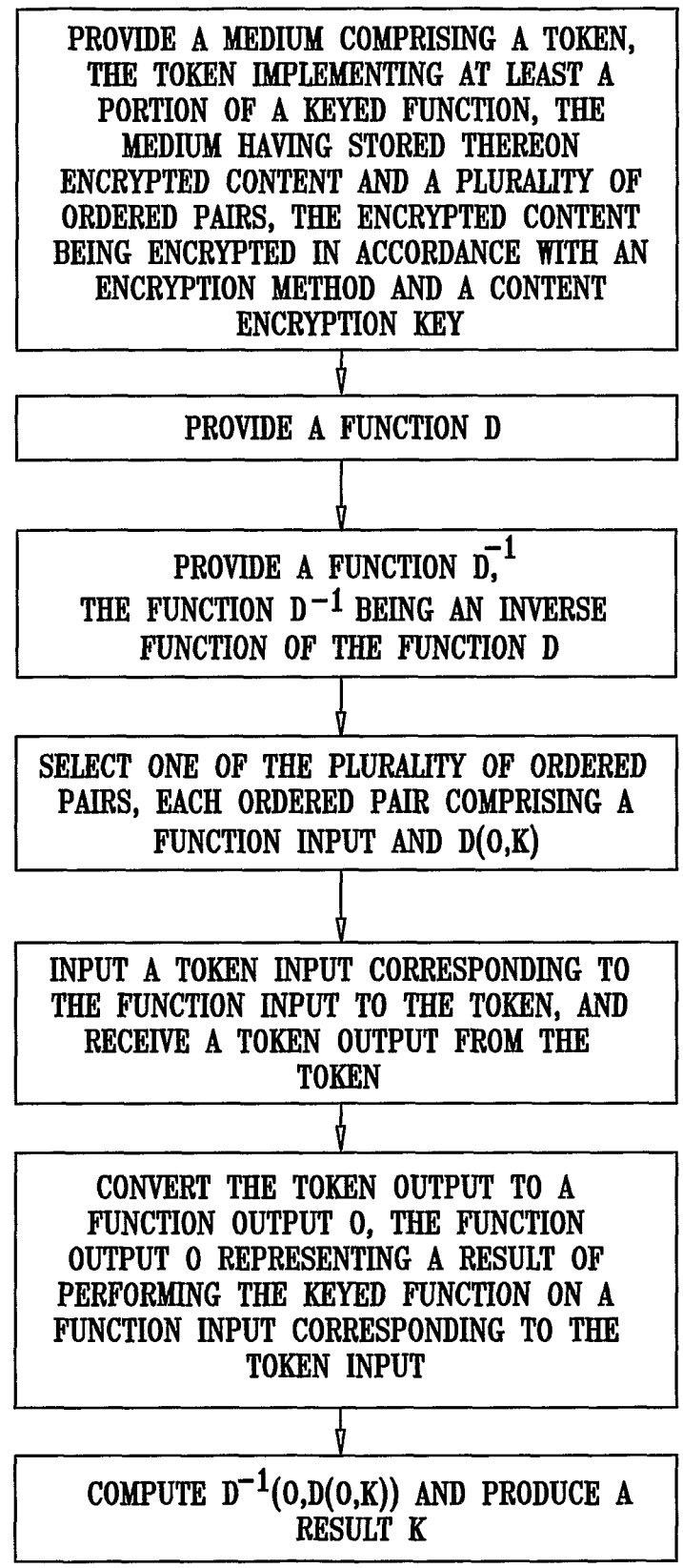
FIG. 13 is a simplified flowchart illustration of a preferred method of computing a secret from the output of an input to a token and a function $D^{-1}$, operative in accordance with another alternative preferred embodiment of the present invention.

Reference is now made to FIG. 13, which is a simplified flowchart illustration of a preferred method of producing a secret from the output of an input to a token and a function $D^{-1}$, operative in accordance with another alternative embodiment of the present invention. The method of FIG. 13 is self-explanatory in light of the above discussion.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined only by the claims which follow:

What is claimed is:

1. A method for producing a medium, the method comprising:
    providing a medium comprising a token, the token implementing at least a portion of a keyed function;
    providing a secret number k;
    providing a function D having an associated inverse function $D^{-1}$, such that for inputs x and y, $D^{-1}(x,D(x,y))=y$;
    receiving at the medium, from externally thereto, a plurality of token inputs, each token input being suitable for input to the token;
    for each one of the plurality of token inputs:
        inputting the token input to the token and receiving a token output from the token;
        transmitting at least the token output to a device external to the medium and performing the following in the device external to the medium:
            converting the token output to a function output o, the function output o representing a result of performing the keyed function on a function input corresponding to the token input;
            computing D(o,k); and
            producing an ordered pair, comprising:
                a function input corresponding to the token input; and
                D(o,k),
    thereby producing a plurality of ordered pairs at the device external to the medium;
    providing a first encryption method and a first encryption key; and
    the device external to the medium storing the plurality of ordered pairs on the medium, other than in the token;
    wherein the storing the plurality of ordered pairs on the medium comprises a subprocess selected from a group consisting of:
        (a) encrypting each ordered pair at the device external to the medium using the first encryption method and the first encryption key; and the device external to the medium storing each encrypted ordered pair on the medium; and
        (b) encrypting the plurality of ordered pairs at the device external to the medium using the first encryption method and the first encryption key, thereby producing an encrypted plurality of ordered pairs; and the device external to the medium storing the encrypted plurality of ordered pairs on the medium.

2. The method according to claim 1 and wherein the secret number k comprises a cryptographic decryption key.

3. The method according to claim 1 and wherein the converting comprises an identity conversion.

4. The method according to claim 1 and wherein each function input is identical to the corresponding token input.

5. The method according to claim 1 and wherein each token input is derived from a corresponding function input.

6. The method according to claim 1 and wherein the plurality of token inputs are produced by performing the following in the device external to the medium:
    providing a plurality of function inputs, each function input being suitable for input to the keyed function; and
    converting the plurality of function inputs to a plurality of token inputs.

7. The method according to claim 1 wherein at least one of the ordered pairs is stored in a medium content area.

8. The method according to claim 1, wherein the storing the plurality of ordered pairs on the medium comprises:
    encrypting each ordered pair at the device external to the medium using the first encryption method and the first encryption key; and
    the device external to the medium storing each encrypted ordered pair on the medium.

9. The method according to claim 1, wherein the storing the plurality of ordered pairs on the medium comprises:
    encrypting the plurality of ordered pairs at the device external to the medium using the first encryption method and the first encryption key, thereby producing an encrypted plurality of ordered pairs; and
    the device external to the medium storing the encrypted plurality of ordered pairs on the medium.

10. The method according to claim 9 and wherein the converting comprises an identity conversion.

11. The method according to claim 9 and wherein each function input is identical to the corresponding token input.

12. The method according to claim 9 and wherein each token input is derived from a corresponding function input.

13. The method according to claim 9 and wherein the plurality of token inputs are produced by performing the following in the device external to the medium:
    providing a plurality of function inputs, each function input being suitable for input to the keyed function; and
    converting the plurality of function inputs to a plurality of token inputs.

14. The method according to claim 9 and wherein the encrypted plurality of ordered pairs is stored in a medium content area.

15. The method according to claim 9 and wherein the encrypted plurality of ordered pairs is stored in a medium control area.

16. The method according to claim 1 and also comprising:
    encrypting content in accordance with a second encryption method and the secret number k, thereby producing encrypted content; and
    storing the encrypted content on the medium.

17. The method according to claim 16 and wherein the first encryption method and the second encryption method are identical.

18. The method according to claim 16 and wherein the first encryption method is different from the second encryption method.

19. A medium for storing content, the medium comprising a physical storage device, the medium comprising:
    a content storage area;
    an ordered pair storage area; and
    a token, the token implementing at least a portion of a keyed function and being operative to receive, from externally to the medium, a plurality of token inputs and produce a plurality of token outputs,
    wherein the ordered pair storage area stores a plurality of ordered pairs, and
    the ordered pair storage area does not comprise the token, and the ordered pairs are produced by performing the following:

providing a secret number k;

providing a function D having an associated inverse function $D^{-1}$, such that for inputs x and y, $D^{-1}(x,D(x,y))=y$;

receiving at the medium, from externally thereto, a plurality of token inputs, each token input being suitable for input to the token;

for each one of the plurality of token inputs:
  inputting the token input to the token and receiving a token output from the token;
  transmitting at least the token output to a device external to the medium and performing the following in the device external to the medium:
    converting the token output to a function output o, the function output o representing a result of performing the keyed function on a function input corresponding to the token input;
    computing D(o,k); and
    producing an ordered pair, comprising:
      a function input corresponding to the token input; and
      D(o,k), and the ordered pairs are received, from the device external to the medium, at the medium for storage thereon; wherein a first encryption method and a first encryption key are provided, and wherein the storing the plurality of ordered pairs on the medium comprises a subprocess selected from a group consisting of:

(a) encrypting each ordered pair at the device external to the medium using the first encryption method and the first encryption key; and the device external to the medium storing each encrypted ordered pair on the medium; and (b) encrypting the plurality of ordered pairs at the device external to the medium using the first encryption method and the first encryption key, thereby producing an encrypted plurality of ordered pairs; and the device external to the medium storing the encrypted plurality of ordered pairs on the medium.

20. The medium according to claim 19 and wherein at least part of the ordered pair storage area is interleaved with the content storage area.

21. The medium according to claim 19 and wherein each ordered pair is separately encrypted.

22. The medium according to claim 19 and wherein the plurality of ordered pairs is encrypted as a unit.

23. The medium according to claim 19 and wherein the content storage area stores content.

24. The medium according to claim 23 and wherein the content is encrypted in accordance with an encryption method and the secret number k.

25. The medium according to claim 19 and wherein the token is adapted to receive an analog token input and produce an analog token output, and the medium also comprises:
  a digital-to-analog input unit receiving a plurality of digital inputs and converting each of the plurality of digital inputs to an analog form suitable for input to the token; and
  an analog-to-digital output unit receiving the plurality of analog outputs from the token and converting each of the plurality of analog outputs into digital form to produce a plurality of digital outputs.

26. The medium according to claim 19 and wherein the token is adapted to receive a digital input and produce a digital output.

* * * * *

UNITED STATES PATENT AND TRADEMARK OFFICE
CERTIFICATE OF CORRECTION

PATENT NO.       : 8,689,340 B2                                                             Page 1 of 1
APPLICATION NO.  : 12/084852
DATED            : April 1, 2014
INVENTOR(S)      : Mantin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1504 days.

Signed and Sealed this

Twenty-ninth Day of September, 2015

Michelle K. Lee
*Director of the United States Patent and Trademark Office*

UNITED STATES PATENT AND TRADEMARK OFFICE
CERTIFICATE OF CORRECTION

Page 1 of 1

PATENT NO. : 8,689,340 B2
APPLICATION NO. : 12/084852
DATED : April 1, 2014
INVENTOR(S) : Mantin et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1588 days.

Signed and Sealed this
Fifth Day of September, 2017

Joseph Matal
*Performing the Functions and Duties of the*
*Under Secretary of Commerce for Intellectual Property and*
*Director of the United States Patent and Trademark Office*